US012625904B2

(12) United States Patent
Kawai et al.

(10) Patent No.: US 12,625,904 B2
(45) Date of Patent: May 12, 2026

(54) INFORMATION PROCESSING APPARATUS, INFORMATION PROCESSING METHOD, AND NON-TRANSITORY COMPUTER READABLE MEDIUM FOR IMAGE RETRIEVAL BASED ON POSE INFORMATION

(71) Applicant: NEC Corporation, Tokyo (JP)

(72) Inventors: Ryo Kawai, Tokyo (JP); Noboru Yoshida, Tokyo (JP); Jianquan Liu, Tokyo (JP); Satoshi Yamazaki, Tokyo (JP); Tingting Dong, Tokyo (JP); Karen Stephen, Tokyo (JP); Youhei Sasaki, Tokyo (JP); Naoki Shindou, Tokyo (JP); Yuta Namiki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/854,600

(22) PCT Filed: Apr. 28, 2022

(86) PCT No.: PCT/JP2022/019290
§ 371 (c)(1),
(2) Date: Oct. 7, 2024

(87) PCT Pub. No.: WO2023/209955
PCT Pub. Date: Nov. 2, 2023

(65) Prior Publication Data
US 2025/0355925 A1 Nov. 20, 2025

(51) Int. Cl.
*G06F 16/532* (2019.01)
*G06F 16/538* (2019.01)
*G06V 40/20* (2022.01)

(52) U.S. Cl.
CPC .......... *G06F 16/532* (2019.01); *G06F 16/538* (2019.01); *G06V 40/23* (2022.01)

(58) Field of Classification Search
CPC ...... G06F 16/532; G06F 16/538; G06V 40/23
See application file for complete search history.

(56) References Cited

U.S. PATENT DOCUMENTS

| | | | |
|---|---|---|---|
| 2007/0041644 A1* | 2/2007 | Kim ..................... | G06V 40/165 |
| | | | 382/190 |
| 2013/0230211 A1* | 9/2013 | Tanabiki ................... | G06T 7/75 |
| | | | 382/103 |

(Continued)

FOREIGN PATENT DOCUMENTS

| | | |
|---|---|---|
| JP | 2013-229011 A | 11/2013 |
| JP | 2019-091138 A | 6/2019 |

(Continued)

OTHER PUBLICATIONS

International Search Report for PCT Application No. PCT/JP2022/019290, mailed on Jul. 19, 2022.

(Continued)

*Primary Examiner* — Jared M Bibbee
(74) *Attorney, Agent, or Firm* — Sughrue Mion, PLLC

(57) ABSTRACT

An information processing apparatus includes a pose acquisition unit, a retrieval unit, and a display control unit. The pose acquisition unit acquires first pose information indicating a pose of a person shown in each of a plurality of reference images associated with a predetermined pose, and second pose information indicating a pose of a capture target person shown in a query image. The retrieval unit retrieves a reference image showing a person whose pose or action is similar to that of the capture target person shown in the query image, from among the plurality of reference images, based on a similarity degree between the first pose information and the second pose information. The display control unit causes a display unit to display at least one of the first pose information and the second pose information in a (Continued)

display mode according to an index used for retrieving the reference image.

15 Claims, 15 Drawing Sheets

(56) References Cited

U.S. PATENT DOCUMENTS

| | | | | |
|---|---|---|---|---|
| 2015/0142708 | A1* | 5/2015 | Jing | G06V 20/70 |
| | | | | 706/12 |
| 2015/0227796 | A1* | 8/2015 | Holzschneider | G06V 20/20 |
| | | | | 382/103 |
| 2019/0122035 | A1* | 4/2019 | Wang | G06V 10/426 |
| 2020/0134295 | A1* | 4/2020 | el Kaliouby | G06V 10/82 |
| 2020/0320738 | A1* | 10/2020 | Kim | G06F 16/587 |
| 2021/0224312 | A1* | 7/2021 | Harikumar | G06F 16/532 |
| 2022/0138249 | A1* | 5/2022 | Xie | G06F 16/56 |
| | | | | 707/737 |

FOREIGN PATENT DOCUMENTS

| | | |
|---|---|---|
| WO | 2021/084677 A1 | 5/2021 |
| WO | 2021/229751 A1 | 11/2021 |
| WO | 2021/250808 A1 | 12/2021 |

OTHER PUBLICATIONS

Zhe Cao, Tomas Simon, Shih-En Wei, Yaser Sheikh, [Realtime Multi-Person 2D Pose Estimation using Part Affinity Fields];, The IEEE Conference on Computer Vision and Pattern Recognition (CVPR), 2017, pp. 7291 to pp. 7299.

JP Office Action for JP Application No. 2024-517767, mailed on Mar. 31, 2026 with English Translation.

Yukito Watanabe et al., "Development of a specific object recognition system capable of building a database at high speed and demonstration experiments at exhibitions," The IEICE Transactions D, The Institute of Electronics, Information and Communication Engineers, Jan. 1, 2018, vol. J101-D, No. 1, pp. 92-103.

* cited by examiner

Figure 4:
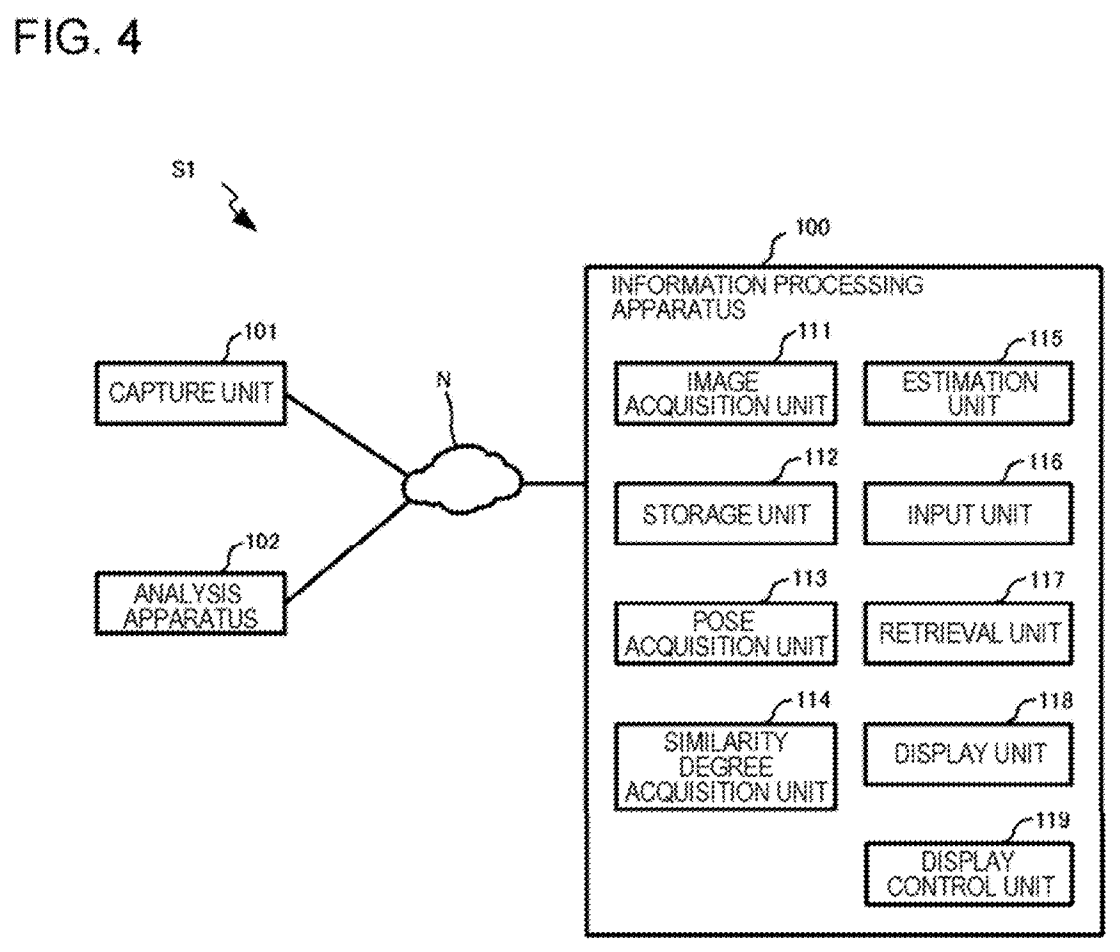

CAPTURE UNIT 101

ANALYSIS APPARATUS 102

INFORMATION PROCESSING APPARATUS 100

IMAGE ACQUISITION UNIT 111

STORAGE UNIT 112

POSE ACQUISITION UNIT 113

SIMILARITY DEGREE ACQUISITION UNIT 114

ESTIMATION UNIT 115

INPUT UNIT 116

RETRIEVAL UNIT 117

DISPLAY UNIT 118

DISPLAY CONTROL UNIT 119

FIG. 8

INFORMATION PROCESSING APPARATUS, INFORMATION PROCESSING METHOD, AND NON-TRANSITORY COMPUTER READABLE MEDIUM FOR IMAGE RETRIEVAL BASED ON POSE INFORMATION

This application is a National Stage Entry of PCT/JP2022/019290 filed on Apr. 28, 2022, the contents of all of which are incorporated herein by reference, in their entirety.

TECHNICAL FIELD

The present invention relates to an information processing apparatus, an information processing method, and a non-transitory computer readable medium.

BACKGROUND ART

For example, an image retrieval apparatus described in Patent Document 1 includes a pose estimation unit, a feature value extraction unit, a query generation unit, and an image retrieval unit.

The pose estimation unit described in the document recognizes, from an input image, pose information of a retrieval target made up of a plurality of keypoints. The feature value extraction unit described in the document extracts a feature value from the pose information and an input image. The query generation unit described in the document generates a retrieval query from an image database that accumulates a feature value in relation to an input image, and pose information specified by a user. The image retrieval unit described in the document retrieves, from the image database, an image including a similar pose according to a retrieval query.

For example, an image processing apparatus described in Patent Document 2 includes an image acquisition unit, a skeleton structure detection unit, a query evaluation unit, a selection unit, a feature value computation unit, and a retrieval unit.

The image acquisition unit described in the document acquires a candidate of a query image. The skeleton structure detection unit described in the document detects a two-dimensional skeleton structure of a person included in the candidate of the query image. The query evaluation unit described in the document computes an evaluation value of the candidate of the query image, based on a detection result of the two-dimensional skeleton structure. The selection unit described in the document selects, based on the evaluation value, a query image from among candidates of query images. The feature value computation unit described in the document computes a feature value of a two-dimensional skeleton structure detected from the query image. The retrieval unit described in the document retrieves, based on a similarity degree of the computed feature value, an analysis target image including a person with a pose similar to a pose of a person included in the query image, from among the analysis target images.

Note that, Patent Document 3 discloses a technique for computing a feature value of each of a plurality of keypoints of a human body included in an image, and retrieving an image including a human body with a similar pose or a human body with a similar motion, based on the computed feature value, or gathering and categorizing those with similar poses or motions. Non-Patent Document 1 describes a technique related to skeleton estimation of a person.

RELATED DOCUMENT

Patent Document

Patent Document 1: Japanese Patent Application Publication No. 2019-091138
Patent Document 2: International Patent Publication No. WO2021/250808
Patent Document 3: International Patent Publication No. WO2021/084677

Non-Patent Document

Non-Patent Document 1: Zhe Cao, Tomas Simon, Shih-En Wei, Yaser Sheikh, [Realtime Multi-Person 2D Pose Estimation using Part Affinity Fields], The IEEE Conference on Computer Vision and Pattern Recognition (CVPR), 2017, pp. 7291 to 7299

DISCLOSURE OF THE INVENTION

Technical Problem

Patent Documents 1 and 2 describe techniques for estimating a pose or action, based on an image. However, in Patent Documents 1 and 2, since it is not known whether a pose has been correctly estimated, it is difficult to improve accuracy of estimating a pose of a capture target person shown in an image.

Note that, Patent Document 3 and Non-Patent Document 1 also do not disclose a technique for improving accuracy of detecting a person being in a previously determined pose from an image capturing a person.

In view of the problem described above, one example of an object of the present invention is to provide an information processing apparatus, an information processing method, and a storage medium that solve improving accuracy of estimating a pose of a capture target person shown in an image.

Solution to Problem

According to one aspect of the present invention, there is provided an information processing apparatus including:

a pose acquisition unit that acquires first pose information indicating a pose of a person shown in each of a plurality of reference images associated with a predetermined pose, and second pose information indicating a pose of a capture target person shown in a query image;

a retrieval unit that retrieves a reference image showing a person whose pose or action is similar to that of the capture target person shown in the query image, from among the plurality of reference images, based on a similarity degree between the first pose information and the second pose information; and a display control unit that causes a display unit to display at least one of the first pose information and the second pose information in a display mode according to an index used for retrieving the reference image.

According to one aspect of the present invention, there is provided an information processing method including, by a computer:

acquiring first pose information indicating a pose of a person shown in each of a plurality of reference images associated with a predetermined pose, and second pose information indicating a pose of a capture target person shown in a query image;

retrieving a reference image showing a person whose pose or action is similar to that of the capture target person shown in the query image, from among the plurality of reference images, based on a similarity degree between the first pose information and the second pose information; and causing a display unit to display at least one of the first pose information and the second pose information in a display mode according to an index used for retrieving the reference image.

According to one aspect of the present invention, there is provided a storage medium storing a program for causing a computer to execute:

acquiring first pose information indicating a pose of a person shown in each of a plurality of reference images associated with a predetermined pose, and second pose information indicating a pose of a capture target person shown in a query image;

retrieving a reference image showing a person whose pose or action is similar to that of the capture target person shown in the query image, from among the plurality of reference images, based on a similarity degree between the first pose information and the second pose information; and causing a display unit to display at least one of the first pose information and the second pose information in a display mode according to an index used for retrieving the reference image.

Advantageous Effects of Invention

According to one aspect of the present invention, it becomes possible to provide an information processing apparatus, an information processing method, and a storage medium that solve improving accuracy of estimating a pose of a capture target person shown in an image.

BRIEF DESCRIPTION OF THE DRAWINGS

FIG. 4 is a diagram illustrating a detailed functional configuration example of the information processing system according to one example embodiment.

FIG. 8 is a diagram illustrating a physical configuration example of an information processing apparatus according to one example embodiment.

EXAMPLE EMBODIMENT

Hereinafter, one example embodiment of the present invention is described by using the drawings. Note that, a similar reference sign is assigned to a similar component in all the drawings, and description is omitted as appropriate.

Example Embodiment (Outline)

Figure 1:
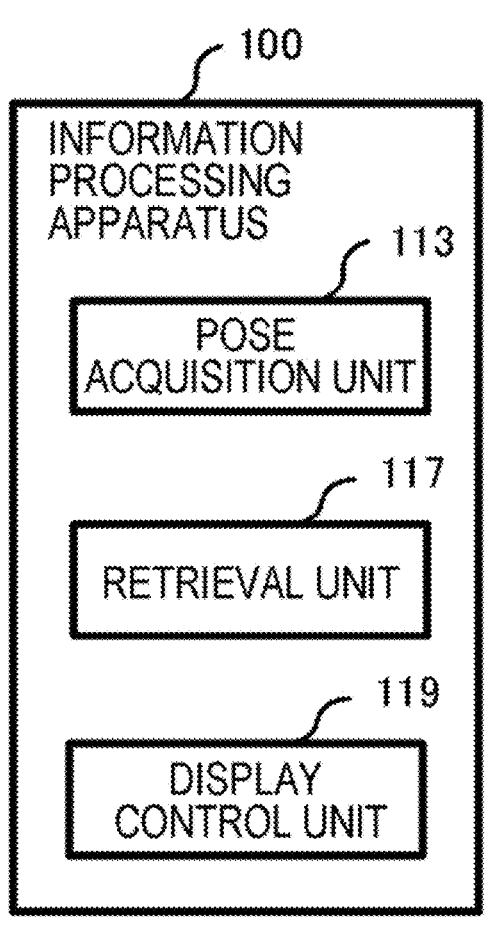
FIG. 1 is a diagram illustrating an outline of an information processing apparatus according to one example embodiment.

FIG. 1 is a diagram illustrating an outline of an information processing apparatus 100 according to one example embodiment. The information processing apparatus 100 includes a pose acquisition unit 113, a retrieval unit 117, and a display control unit 119.

The pose acquisition unit 113 acquires first pose information indicating a pose of a person shown in each of a plurality of reference images associated with a predetermined pose, and second pose information indicating a pose of a capture target person shown in a query image.

The retrieval unit 117 retrieves a reference image showing a person whose pose or action is similar to that of the capture target person shown in the query image, from among the plurality of reference images, based on a similarity degree between the first pose information and the second pose information.

The display control unit 119 causes a display unit to display at least one of the first pose information and the second pose information in a display mode according to an index used for retrieving the reference image.

According to the information processing apparatus 100, it becomes possible to provide an information processing apparatus that solves improving accuracy of estimating a pose of a capture target person shown in an image.

Figure 2:
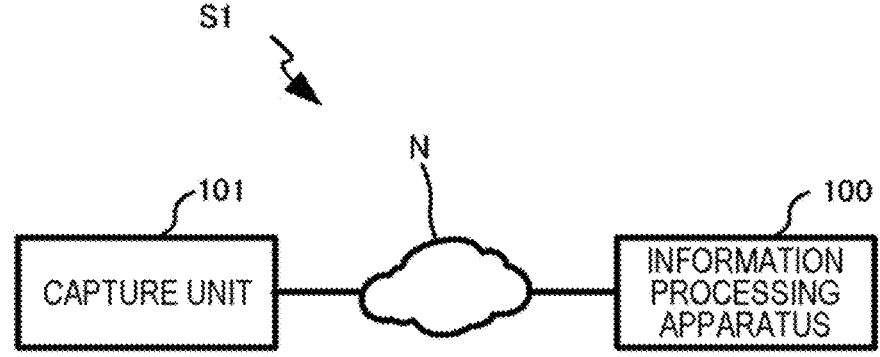
FIG. 2 is a diagram illustrating an outline of an information processing system according to one example embodiment.

FIG. 2 is a diagram illustrating an outline of an information processing system S1 according to one example embodiment. The information processing system S1 includes a capture unit 101 for capturing a query image, and the information processing apparatus 100.

According to the information processing system S1, it becomes possible to provide an information processing system that solves improving accuracy of estimating a pose of a capture target person shown in an image.

Figure 3:
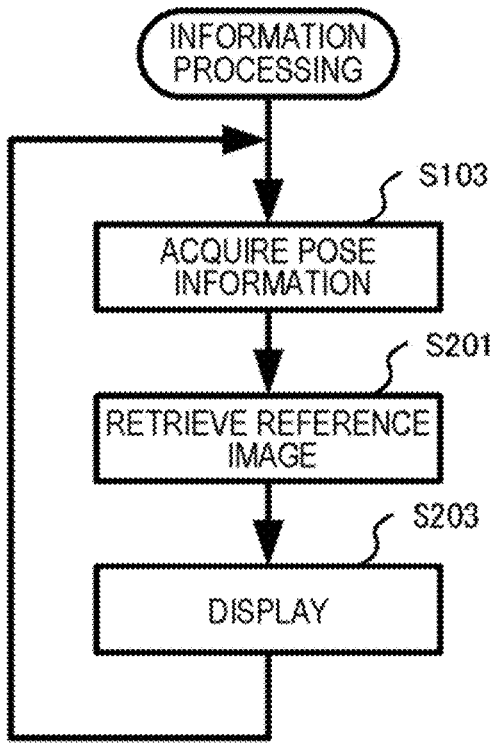
FIG. 3 is a flowchart illustrating an outline of information processing according to one example embodiment.

FIG. 3 is a flowchart illustrating an outline of information processing according to one example embodiment.

The pose acquisition unit 113 acquires first pose information indicating a pose of a person shown in each of a plurality of reference images associated with a predetermined pose, and second pose information indicating a pose of a capture target person shown in a query image (step S103).

The retrieval unit 117 retrieves a reference image showing a person whose pose or action is similar to that of the capture target person shown in the query image, from among the plurality of reference images, based on a similarity degree between the first pose information and the second pose information (step S201).

The display control unit 119 causes the display unit to display at least one of the first pose information and the second pose information in a display mode according to an index used for retrieving the reference image (step S203).

According to the information processing, it becomes possible to provide an information processing method that solves improving accuracy of estimating a pose of a capture target person shown in an image.

(Details)

A detailed example of the information processing system S1 according to one example embodiment is described below.

FIG. 4 is a diagram illustrating a detailed functional configuration example of the information processing system S1 according to one example embodiment. The information processing system S1 includes the capture unit 101, the information processing apparatus 100, and an analysis apparatus 102. The capture unit 101, the information processing apparatus 100, and the analysis apparatus 102 are connected via a network N configured wiredly, wirelessly, or by a combination thereof, and can transmit and receive information to and from each other.

The capture unit 101 captures a person (capture target person) performing a predetermined action. The capture unit 101 is, for example, a camera that is installed in a store of a financial institution such as a bank, and captures an operator who operates an automatic teller machine (ATM).

Note that, the capture unit 101 is not limited to a camera for capturing an operator of an ATM, and may be a camera that captures an inside of a store such as a bank, or may be a camera installed in various stores or the like other than a financial institution. Moreover, the number of capture units 101 may be plural.

The capture unit 101 captures a predetermined capture area, and transmits image information indicating a moving image to the information processing apparatus 100.

Specifically, the capture unit 101 temporally sequentially captures a plurality of times at a predetermined frame rate. The capture unit 101 generates frame information including a frame image in each capture. The capture unit 101 transmits frame information including each of the time-series frame images to the information processing apparatus 100 via the network N.

The analysis apparatus 102 is an apparatus that analyzes an image. The analysis apparatus 102 acquires, via the network N, image information generated by the capture unit 101. Although an example in which the analysis apparatus 102 acquires image information from the capture unit 101 via the information processing apparatus 100 is described in the present example embodiment, image information may be directly acquired from the capture unit 101.

The analysis apparatus 102 is an apparatus that analyzes an image included in the acquired image information.

Specifically, the analysis apparatus 102 includes one or a plurality of analysis functions that perform processing (analysis processing) for analyzing an image. The analysis function included in the analysis apparatus 102 is one or a plurality of (1) an object detection function, (2) a face analysis function, (3) a person figure analysis function, (4) a pose analysis function, (5) an action analysis function, (6) an appearance attribute analysis function, (7) a gradient feature analysis function, (8) a color feature analysis function, (9) a flow line analysis function, and the like.

(1) The object detection function detects a person and an object from an image. The object detection function can also derive a position of the person and the object within the image. As a model to be applied to the object detection processing, there is, for example, you only look once (YOLO). The object detection function detects, for example, an operator, a mobile phone (including a smartphone), a wheelchair, and the like. For example, the object detection function derives a position of the detected person and object.

(2) The face analysis function detects a face of a person from an image, performs extraction of a feature value (face feature value) of the detected face, categorization (classification) of the detected face, and the like. The face analysis function can also derive a position of a face within an image. The face analysis function can also determine, based on a similarity degree between face feature values of persons detected from different images or the like, identity of the persons detected from the different images.

(3) The person figure analysis function performs extraction of a human body feature value of a person included in an image (e.g., a value indicating an overall feature such as fatness and thinness of a body shape, a height, and clothing), categorization (classification) of a person included in an image, and the like. The human shape analysis function can also determine a position of a person within an image. The person figure analysis function can also determine identity of a person included in a different image, based on a human body feature value or the like of a person included in different images.

(4) The pose analysis function generates pose information indicating a pose of a person. The pose information includes, for example, a pose estimation model of a person. The pose estimation model is a model in which a joint of a person estimated from an image is connected. The pose estimation model is made up of a plurality of model elements associated with a joint element associated with a joint, a trunk element associated with a torso, a bone element associated with a bone connecting joints, and the like. The pose analysis function, for example, detects joint points of a person from an image, connects the joint points, and produces a pose estimation model.

Then, the pose analysis function estimates a pose of a person by using information of the pose estimation model, and performs extraction of a feature value of the estimated pose (pose feature value), categorization (classification) of a person included in an image, and the like. The pose analysis function can also determine, based on a pose feature value or the like of a person included in a different image, identity of the person included in the different image.

For example, the pose analysis function produces pose estimation models of a talking pose, a wheelchair pose, and the like, and extracts a pose feature value in the poses. The talking pose is a pose for talking by using a mobile phone. The wheelchair pose is a pose of a person utilizing a wheelchair.

For example, techniques disclosed in Patent Document 3 and Non-Patent Document 1 can be applied to the pose analysis function.

(5) The action analysis processing can estimate motion of a person perform by using the information of a pose estimation model, a change in pose, and the like, and perform extraction of a feature value of motion of a person (motion feature value), categorization (classification) of a person included in an image, and the like. The action analysis processing can also estimate a height of a person or determine a position of a person within an image by using information of a stick figure model. The action analysis processing can estimate, for example, a change or transition in pose and an action such as movement (a change or transition in position) from an image, and extract a motion feature value of the action.

(6) The appearance attribute analysis function can recognize an appearance attribute accompanying a person. The appearance attribute analysis function performs extraction of a feature value (appearance attribute feature value) relating to a recognized appearance attribute, categorization (classification) of a person included in an image, and the like. The appearance attribute is an appearance attribute, and includes, for example, one or more of a color of clothes, a color of a shoe, a hairstyle, wearing or non-wearing of a hat, a tie, glasses, or the like, and the like.

(7) The gradient feature analysis function extracts a feature value of a gradient (gradient feature value) in an image. For example, techniques such as SIFT, SURF, RIFF, ORB, BRISK, CARD, and HOG can be applied to the gradient feature detection processing.

(8) The color feature analysis function can detect an object from an image, and perform extraction of a feature value of a color (color feature value) of the detected object, categorization (classification) of the detected object, and the like. The color feature value is, for example, a color histogram or the like. The color feature analysis function can detect, for example, a person or an object included in an image.

(9) The flow line analysis function can derive, by using, for example, a result of determination of identity in any of the analysis functions of (2) to (6) described above, a flow line (a trajectory of movement) of a person included in a video. Specifically, for example, by connecting persons determined to be the same in images that are different in a time series, a flow line of the person can be determined. Note that, the flow line analysis function can also derive a flow line spanning a plurality of videos capturing different capture areas, in such a case that videos captured by a plurality of the capture units 101 that capture different capture areas are acquired.

The Image feature value includes, for example, a detection result of an article in the object detection function, a face feature value, a human body feature value, a pose feature value, a motion feature value, an appearance attribute feature value, a gradient feature value, a color feature value, and a flow line.

Note that, each of the analysis functions (1) to (9) may utilize a result of an analysis performed by another analysis function as appropriate. The information processing apparatus 100 may include an analysis unit with a function of the analysis apparatus 102.

The information processing apparatus 100 according to one example embodiment is an apparatus that estimates a pose of a person included in a frame image. As illustrated in FIG. 4, the information processing apparatus 100 functionally includes an image acquisition unit 111, a storage unit 112, the pose acquisition unit 113, a similarity degree acquisition unit 114, an estimation unit 115, an input unit 116, the retrieval unit 117, a display unit 118, and the display control unit 119.

The image acquisition unit 111 acquires image information indicating a moving image from the capture unit 101. In other words, the image acquisition unit 111 acquires a plurality of time-series frame images acquired by a plurality of temporally sequential captures.

Specifically, the image acquisition unit 111 acquires frame information including each of a plurality of time-series frame images from the capture unit 101. The image acquisition unit 111 stores the acquired frame information.

The storage unit 112 is a storage unit for storing various pieces of information. The storage unit 112 previously stores, for example, reference information 112a indicating a reference image, weight information 112b indicating a weight, and the like.

The reference image is an image of a person associated with a predetermined pose. The reference image is an image that is referred to in order to estimate a pose of a person included in a query image, is appropriately chosen, and set in the storage unit 112. A predetermined pose is, for example, a talking pose, a wheelchair pose, or the like. Note that, the talking pose may be set by being subdivided into a right-hand talking pose being a pose for talking while holding a mobile phone with a right hand, a left-hand talking pose being a pose for talking while holding a mobile phone with a left hand, and the like.

Figure 5:
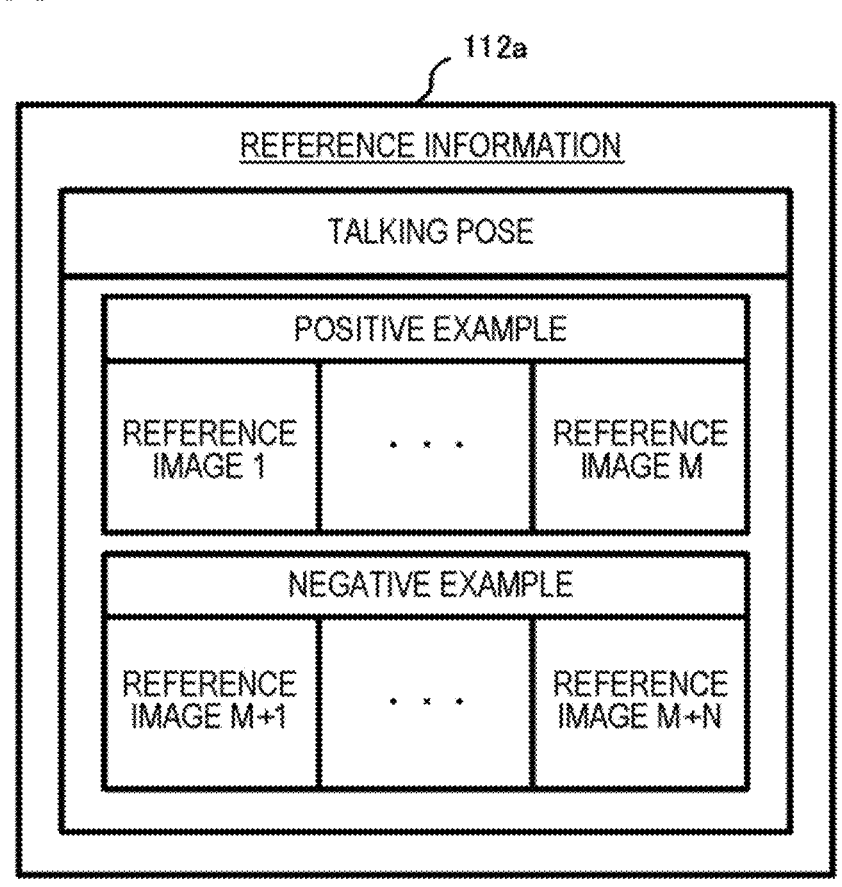
FIG. 5 is a diagram illustrating a configuration example of reference information including a reference image associated with a talking pose.

FIG. 5 is a diagram illustrating a configuration example of the reference information 112a including a reference image associated with a talking pose. The reference information 112a illustrated in FIG. 5 includes, for example, a positive example and a negative example.

The positive example is a reference image of a person being in a talking pose. For example, the positive example shows a person standing and talking while holding a mobile phone with a right or left hand.

The negative example is a reference image of a person who is not in a talking pose. As a negative example, it is preferable to choose an image of a person who is not in a talking pose but is in a pose similar to the talking pose. For example, a negative example shows a person in an upright pose without holding a mobile phone.

FIG. 5 illustrates an example of the reference information 112a including M positive examples and N negative examples in association with talking poses. Herein, both M and N are integers of 1 or more.

Note that, the reference information 112a may include any number of reference images as long as the reference information 112a includes at least one reference image. Further, the reference information 112a may include only a positive example.

The weight is a value indicating a degree to which each model element is emphasized in order to derive a similarity degree between pose estimation models in a predetermined pose. The weight information 112b includes a weight of each model element for each predetermined pose.

Figure 6:
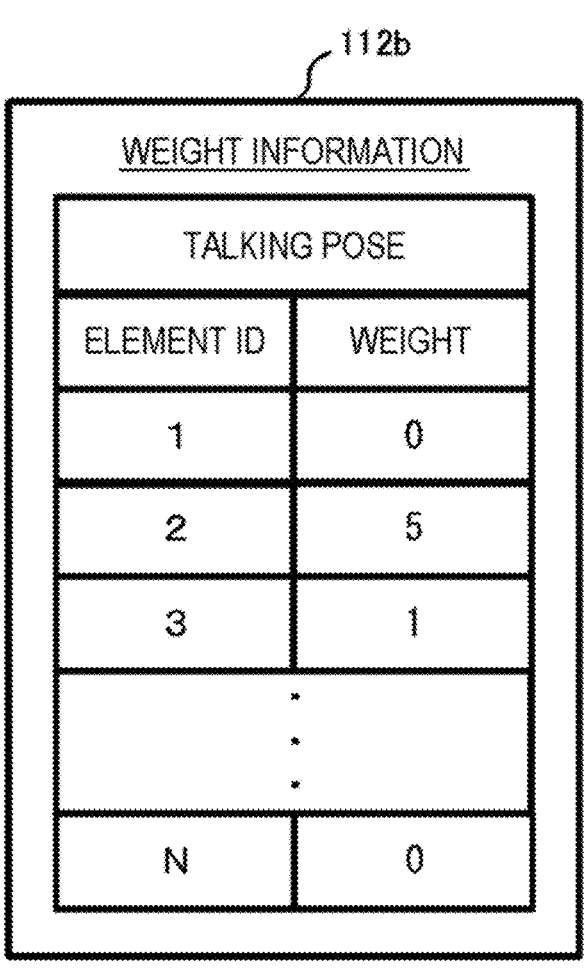
FIG. 6 is a diagram illustrating a configuration example of weight information indicating a weight associated with a talking pose.

FIG. 6 is a diagram illustrating a configuration example of the weight information 112b indicating a weight associated with a talking pose. The weight information 112b illustrated in FIG. 6 relates an element ID and a weight in a talking pose. The element ID is information for identifying a model element. The element ID is, for example, a number appropriately assigned to each of a trunk element, a bone element associated with upper and lower parts of left and right arms, thighs and lower legs of left and right legs, and the like, and a joint element, or the like. A weight is determined for each model element of a predetermined pose. Although FIG. 6 illustrates an example in which a weight is an integer of equal to or more than 0, a setting method of a weight may be changed as appropriate.

For example, since talking is performed while holding a mobile phone in the talking pose, a weight set in relation to an arm is larger than a weight set in relation to a leg. Moreover, for example, in a talking pose in a case of talking with a right hand, a weight set in relation to the right hand is larger than a weight set in relation to a left hand.

The pose acquisition unit 113 acquires, from the storage unit 112, a plurality of reference images associated with a predetermined pose such as a talking pose, and acquires first pose information, based on the acquired plurality of reference images.

The first pose information is information indicating a pose of a person shown in each of a plurality of reference images associated with a predetermined pose. The first pose information includes, for example, a first model being a pose estimation model relating to a person shown in a reference image.

Moreover, the pose acquisition unit 113 acquires a time-series frame image from the image acquisition unit 111, and acquires a query image by thinning out a part of the time-series frame image. Then, the pose acquisition unit 113 acquires second pose information, based on the acquired query image.

The second pose information is information indicating a pose of a capture target person shown in a query image. The second pose information includes, for example, a second model that is a pose estimation model relating to the capture target person shown in the query image.

Specifically, for example, the pose acquisition unit 113 transmits each of the acquired reference image and query image to the analysis apparatus 102 via the network N. In a case where the reference image is transmitted to the analysis apparatus 102, the pose acquisition unit 113 acquires, from the analysis apparatus 102, first pose information including a first model relating to the person shown in the reference image. In a case where the query image is transmitted to the analysis apparatus 102, the pose acquisition unit 113 acquires, from the analysis apparatus 102, second pose information including a second model relating to the person shown in the query image.

For each combination of a time-series query image and a plurality of reference images associated with a predetermined pose, the similarity degree acquisition unit 114 derives a similarity degree relating to a pose of the capture target person shown in the query image and the person shown in the reference images.

The similarity degree is a value indicating a degree at which pose estimation models are similar in a predetermined pose.

For example, the similarity degree acquisition unit 114 acquires, from the pose acquisition unit 113, a first model of a person shown in each of a plurality of reference images associated with a predetermined pose. Moreover, the similarity degree acquisition unit 114 acquires, from the pose acquisition unit 113, a second model of a capture target person shown in each time-series query image. The similarity degree acquisition unit 114 derives a similarity degree by using the first model and the second model for each combination of the first model and the second model.

The similarity degree includes an overall similarity degree and an element similarity degree.

The overall similarity degree is a value indicating the overall degree at which the first model and the second model are similar in a predetermined pose, that is, an overall similarity degree between the first model and the second model.

The element similarity degree is a similarity degree for each model element associated between the first model and the second model in a predetermined pose, that is, a similarity degree for each model element associated between the first model and the second model.

Note that, the similarity degree may include at least one of the overall similarity degree and the element similarity degree.

Figure 7:
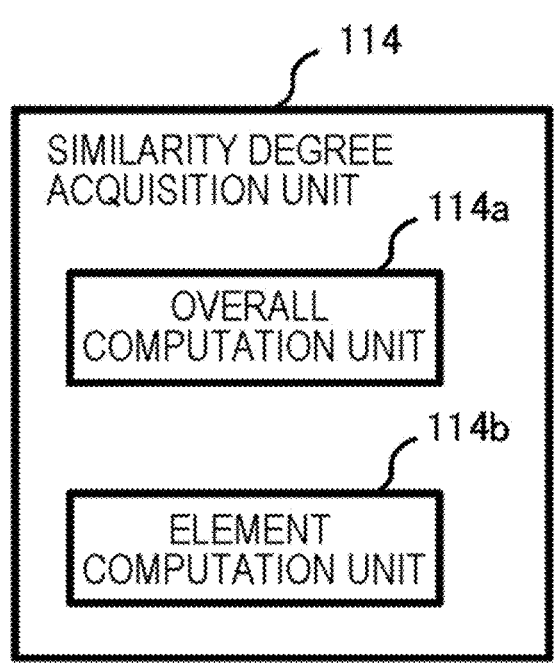
FIG. 7 is a diagram illustrating a functional configuration example of a similarity degree acquisition unit according to one example embodiment.

FIG. 7 is a diagram illustrating a functional configuration example of the similarity degree acquisition unit 114 according to the present example embodiment. The similarity degree acquisition unit 114 includes an overall computation unit 114a and an element computation unit 114b.

The overall computation unit 114a derives an overall similarity degree between the first model and the second model. Specifically, the overall computation unit 114a derives an overall similarity degree by using a weight associated with a predetermined pose included in the weight information 112b and an element similarity degree derived by the element computation unit 114b.

For example, in a case where the overall computation unit 114a acquires a similarity degree of each model element from the element computation unit 114b, the overall computation unit 114a derives a product of each similarity degree of the model element and a weight of an associated model element, and adds products acquired for each model element making up a pose estimation model. A value acquired as a result of the addition is an overall similarity degree.

The element computation unit 114b derives an element similarity degree being a similarity degree for each associated model element between the first model and the second model. The element computation unit 114b derives an element similarity degree, for example, for each model element associated between the first model and the second model, based on a size, a length, a gradient, and the like.

The estimation unit 115 estimates, based on a plurality of query images acquired based on a plurality of captures while a predetermined action is performed, and a reference image showing a person associated with a predetermined pose, a pose of a capture target person shown in each of the plurality of query images.

For example, the estimating unit 115 estimates a pose of a capture target person shown in each of time-series query images, based on a similarity degree (e.g., overall similarity degree) derived by the similarity degree acquisition unit 114.

Moreover, the estimating unit 115 may estimate, based on at least one thinned-out frame image among the time-series frame images, and the reference image, a pose of a capture target person shown in the at least one thinned-out frame image.

In this case, the pose acquisition unit 113 acquires at least one thinned-out frame image from the image acquisition unit 111, and acquires a second model of the capture target person shown in the frame image. The similarity degree acquisition unit 114 derives an overall similarity degree, based on the second model of the capture target person shown in the frame image, and the first model of the person shown in each of the plurality of reference images. Then, the estimation unit 115 estimates, based on the overall similarity degree acquired by the similarity degree acquisition unit 114, a pose of the capture target person shown in the at least one thinned-out frame image.

There are various methods for the estimation unit 115 to estimate a pose of a capture target person, based on a similarity degree. As examples of the methods, pose estimation methods 1 to 5 are described below.

(Pose Estimation Method 1)

For example, the estimating unit 115 may estimate a pose of a capture target person shown in a query image or a frame image, based on the reference image with the largest similarity degree value among positive examples and negative examples. In this case, for example, in a case where a reference image with a maximum similarity degree is a positive example, the estimation unit 115 estimates that a pose of a capture target person is a predetermined pose associated with the reference image. In a case where the reference image with the maximum similarity degree is a negative example, the estimation unit 115 estimates that a pose of the capture target person is not the predetermined pose associated with the reference image.

(Pose Estimation Method 2)

Moreover, for example, the estimation unit 115 may estimate a pose of a capture target person shown in a query image or a frame image, based on a positive example average value and a negative example average value. The positive example average value is an average value of similarity degrees between a plurality of positive examples associated with a predetermined pose and the query image or a frame image. The negative example average value is an average value of similarity degrees between a plurality of negative examples associated with a predetermined pose and a query image or a frame image.

In this case, for example, in a case where the positive example average value is larger than the negative example average value, the estimation unit 115 estimates that a pose of a capture target person is a predetermined pose associated with the reference image. In a case where the positive example average value is equal to or less than the negative example average value, the estimation unit 115 estimates that a pose of a capture target person is not the predetermined pose associated with the reference image.

(Pose Estimation Method 3)

Further, for example, the estimation unit 115 may perform image matching between a query image or a frame image and a reference image, and may estimate a pose of a capture target person shown in the query image or the frame image, based on a similarity degree between the reference image and the query image or the frame image matched in the image matching. In this case, the estimation unit 115 may estimate a pose of a capture target person shown in the query image or the frame image, based on the positive example average value and the negative example average value among the reference images matched by image matching.

Specifically, for example, in a case where the positive example average value among the reference images matched in image matching is larger than the negative example average value, the estimation unit 115 determines that a pose of a capture target person is a predetermined pose associated with the reference image. In a case where the positive example average value among the reference images matched in image matching is equal to or less than the negative example average value, the estimating unit 115 estimates that the pose of the capture target person is not the predetermined pose associated with the reference image.

Note that, various known techniques may be applied to image matching. For example, the estimation unit 115 derives a similarity degree between images, based on a feature value between a capture target person shown in the query image or the frame image and a person shown in the reference image, or the like. The estimation unit 115 determines whether the query image or the frame image and the reference image match, by comparing the similarity degree between images with a threshold value. For example, the estimating unit 115 determines that the images match (similar) in a case where a similarity degree between the images is equal to or more than the threshold value, and determines that the images do not match (dissimilar) in a case where a similarity degree between the images is less than the threshold value.

(Pose Estimation Method 4)

The estimation unit 115 may estimate a pose of a capture target person by using only image matching without using a similarity degree.

For example, the estimating unit 115 may estimate that a capture target person shown in a query image or a frame image is in a predetermined pose associated with the reference image in a case of matching at least one positive example in image matching. Moreover, for example, the estimation unit 115 may estimate that a capture target person shown in a query image or a frame image is not in a predetermined pose associated with the reference image in a case of matching at least one negative example in image matching.

Further, for example, the estimating unit 115 may estimate a pose of a capture target person, based on the number of matches between positive examples and negative examples that match in image matching. In this case, for example, in a case where the number of matches with the positive example is larger than the number of matches with the negative example, the estimation unit 115 estimates that the capture target person shown in the query image or the frame image is in a predetermined pose associated with the reference image. Moreover, for example, in a case where the number of matches with the positive example is equal to or less than the number of matches with the negative example, the estimation unit 115 estimates that a capture target person shown in the query image or a frame image is not in the predetermined pose associated with the reference image.

In image matching, in a case where a query image or a frame image does not match either the positive example or the negative example, the estimation unit 115 may determine that the query image or the frame image is different from either the positive example or the negative example, and may determine that the query image or the frame image is a negative example.

(Pose Estimation Method 5)

The estimation unit 115 may perform machine learning using the reference image, and determine, by using a trained learning model, whether a query image or a frame image matches (is similar to) a positive example or a negative example. The learning model is a trained learning model that has performed machine learning for determining whether a capture target person matches a positive example or a negative example. In this case, the estimation unit 115 inputs image information including a query image indicating the capture target person or the frame image into a learning model, and thereby acquires a determination result of whether the query image or the frame image matches (is similar to) a positive example or a negative example.

The input data to the learning model during learning includes image information indicating a person. Further, in learning, supervised learning including a label (correct answer) indicating whether input data match a positive example or a negative example is preferably performed.

The input unit 116 is a keyboard, a mouse, a touch panel, or the like that accepts input from a user.

The retrieval unit 117 acquires, for example, a query image appropriately specified by a user. The retrieval unit 117 retrieves a reference image indicating a person whose pose or action is similar to that of the capture target person shown in the query image from among the plurality of reference images, based on a similarity degree between first pose information and second pose information. For example, the retrieval unit 117 outputs, as a retrieval result, a reference image whose similarity degree is equal to or more than a previously set criterion value.

The query image to be specified by a user may be any of frame images, or may be an image other than an image captured by the capture unit 101. A criterion value to be used for retrieval may be a value relating to an overall similarity degree, or may be a value relating to an element similarity degree.

In a case where a criterion value is determined in relation to an element similarity degree, the retrieval unit 117 outputs, as a retrieval result, for example, a reference image associated with a first model including an element similarity degree equal to or more than the criterion value.

The display unit 118 is a display or the like that displays various pieces of information. The display control unit 119 controls the display unit 118, and causes the display unit 118 to display various pieces of information. For example, in a case where the estimation unit 115 detects a capture target person in a predetermined pose, the display control unit 119 causes the display unit 118 to display a query image or a frame image in which a mark is given to the capture target person. The mark is, for example, a rectangular frame or the like surrounding the capture target person.

Further, the display control unit 119 causes the display unit 118 to display at least one of first pose information and second pose information in a display mode according to an index used for retrieving the reference image.

The index used for retrieving the reference image is, for example, one or a plurality of a similarity degree, a weight, and the like. Note that, an index used for retrieving the reference image is not limited to these. The display mode is, for example, a thickness, a color, and a line type of a line representing a trunk element, a thickness, a color, and a line type of a line representing a bone element, and a size, a color, and a line type of a figure (e.g., a circle, a square, or the like) representing a joint element, or the like. The line type is, for example, a solid line, a dotted line, a broken line, a chain line, a chain double-dot line, or the like.

Specifically, the display control unit 119 causes the display unit 118 to display, in a display mode according to the index, at least one of first pose information associated with a reference image included in a retrieval result of the retrieval unit 117, and second pose information associated with a user-specified query image acquired by the retrieval unit 117.

In a case where retrieval results output from the retrieval unit 117 are more than a previously determined maximum display number, the display control unit 119 may choose, as a display target, a reference image with the maximum display number in order from a reference image associated with a first model with a large similarity degree.

In a case where the index includes a similarity degree, the display control unit 119 may cause the display unit 118 to display at least one of first pose information and second pose information in a display mode according to a similarity degree.

In a case where the second pose information is displayed, the display control unit 119 may relate the second pose information to a specific reference image among a plurality of reference images, and cause the display unit 118 to display the second pose information in a display mode according to a similarity degree between the second pose information and the first pose information associated with the specific reference image.

In this case, the first pose information and the second pose information may include the first model and the second model, respectively. In a case where the second model is displayed, the display control unit 119 may relate the second model to a specific reference image among a plurality of reference images, and cause the display unit 118 to display the second model in a display mode according to a similarity degree between the second model and the first model associated with the specific reference image.

The first model associated with a specific reference image is one of a first model with the largest overall similarity degree, a first model with the largest element similarity degree, a first model specified by a user, and the like, between the first model and the second model.

In a case where the second model is displayed, the display control unit 119 may derive an average value of element similarity degrees for each model element between the second model and each of the first models output as a retrieval result for the second model, and cause the display unit 118 to display the second model in a display mode according to the average value.

In a case where a similarity degree includes an element similarity degree, the display control unit 119 may cause the display unit 118 to display only a model element with the element similarity degree equal to or more than a first criterion value and equal to or less than a second criterion value or with a weight equal to or more than a predetermined threshold value, among model elements making up at least one of the first model and the second model. Each of the first criterion value and the second criterion value is a value set as appropriate.

In a case where an index includes a weight, the display control unit 119 may cause the display unit 118 to display a plurality of model elements making up at least one of the first model and the second model in a display mode according to the weight.

The display control unit 119 may cause the display unit 118 to display, as a line with an arrow, at least one of the trunk element and the bone element that are model elements.

(Physical Configuration of Information Processing System S1)

The information processing system S1 is physically made up of the capture unit 101, the information processing apparatus 100, and the analysis apparatus 102 that are connected via a network N. Each of the capture unit 101, the information processing apparatus 100, and the analysis apparatus 102 is configured from a single physically different apparatus. The capture unit 101 is, for example, a camera.

Note that, the information processing apparatus 100 and the analysis apparatus 102 may each be configured from a physically single apparatus, and, in this case, the information processing apparatus 100 and the analysis apparatus 102 are connected by using an internal bus 1010 described later, instead of the network N. Moreover, one or both of the information processing apparatus 100 and the analysis apparatus 102 may be configured from a plurality of apparatuses physically connected via an appropriate communication line such as the network N.

Figure 8:
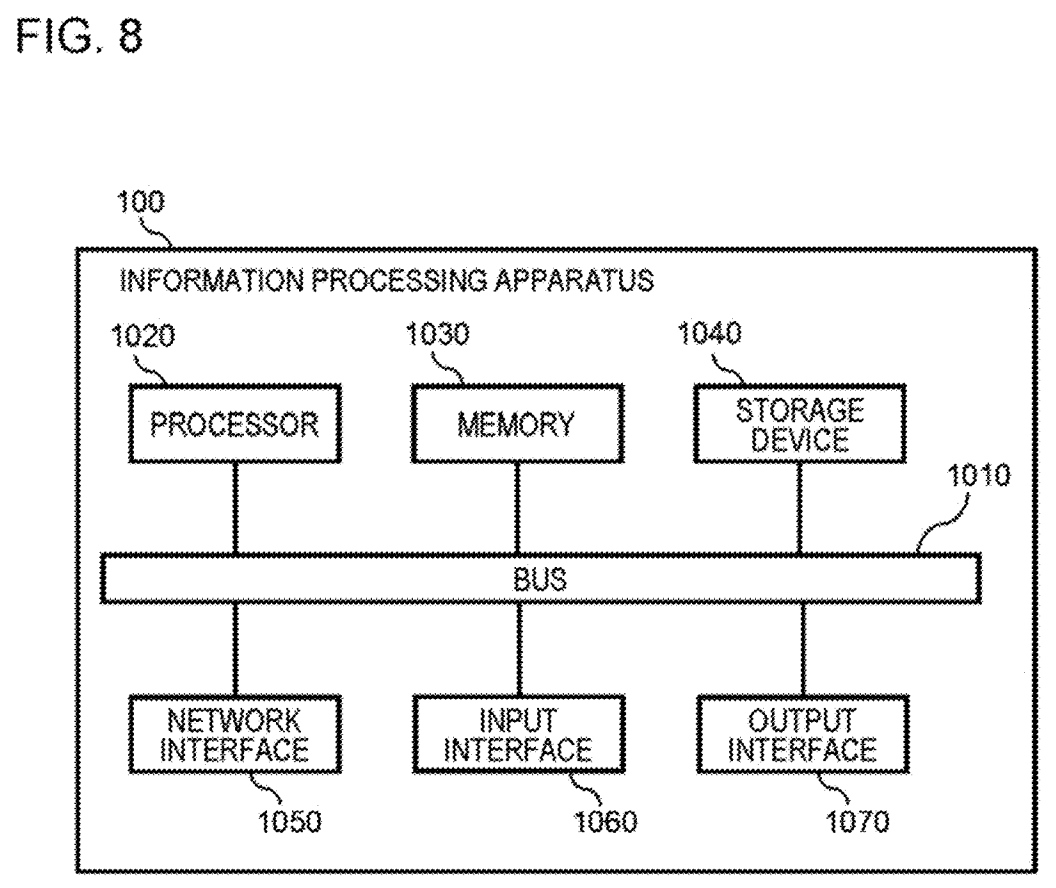

FIG. 8 is a diagram illustrating a physical configuration example of the information processing apparatus 100 according to the present example embodiment. The information processing apparatus 100 is, for example, a general-purpose computer. The information processing apparatus 100 includes, for example, the bus 1010, a processor 1020, a memory 1030, a storage device 1040, a network interface 1050, an input interface 1060, and an output interface 1070.

The bus 1010 is a data transmission path through which the processor 1020, the memory 1030, the storage device 1040, the network interface 1050, the input interface 1060, and the output interface 1070 transmit/receive data to/from one another. However, a method of mutually connecting the processor 1020 and the like is not limited to bus connection.

The processor 1020 is a processor achieved by a central processing unit (CPU), a graphics processing unit (GPU), or the like.

The memory 1030 is a main storage apparatus achieved by a random access memory (RAM) or the like.

The storage device 1040 is an auxiliary storage apparatus achieved by a hard disk drive (HDD), a solid state drive (SSD), a memory card, a read only memory (ROM), or the like. The storage device 1040 stores a program module for achieving each function of the information processing apparatus 100. The processor 1020 reads each of the program modules onto the memory 1030, executes the read program module, and thereby achieves each function associated with the program module.

The network interface 1050 is an interface for connecting the information processing apparatus 100 to the network N.

The input interface 1060 is an interface for a user to input information. The input interface 1060 is made up of one or a plurality of, for example, a keyboard, a mouse, a touch panel, and the like.

The output interface 1070 is an interface for presenting information to a user. The output interface 1070 is made up of, for example, a liquid crystal panel, an organic electro-luminescence (EL) panel, and the like.

The analysis apparatus 102 is physically, for example, a general-purpose computer. The analysis apparatus 102 is physically configured in a substantially similar manner to the information processing apparatus 100 (see FIG. 8).

The storage device 1040 of the analysis apparatus 102 stores a program module for achieving each function of the analysis apparatus 102. The processor 1020 of the analysis apparatus 102 reads each of the program modules onto the memory 1030, executes the read program module, and thereby achieves each function associated with the program module. The network interface 1050 of the analysis apparatus 102 is an interface for connecting the analysis apparatus 102 to the network N. Except for these points, the analysis apparatus 102 may be physically configured similarly to the information processing apparatus 100.

(Operation of Information Processing System S1)

The information processing system S1 according to the present example embodiment executes processing for estimating a pose of a capture target person included in a query image. The processing executed by the information processing system S1 includes pose estimation processing and estimation support processing.

The pose estimation processing is processing of estimating a pose of a capture target person included in a query image by using a reference image associated with a predetermined pose. The estimation support processing is processing for supporting estimation of a pose of a capture target person.

Figure 9:
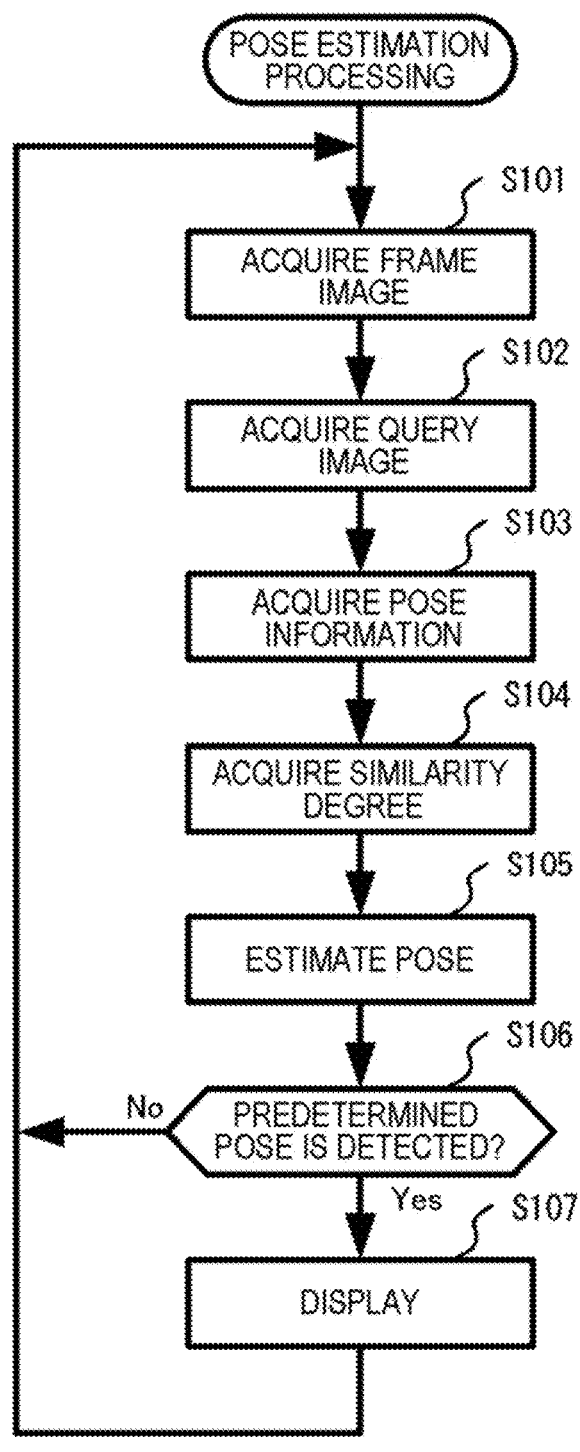
FIG. 9 is a flowchart illustrating one example of pose estimation processing according to one example embodiment.

FIG. 9 is a flowchart illustrating one example of pose estimation processing according to the present example embodiment. The pose estimation processing is executed, for example, during running of the information processing system S1.

The image acquisition unit 111 acquires a plurality of time-series frame images (step S101). The image acquisition unit 111 stores the acquired frame images.

Specifically, for example, the image acquisition unit 111 sequentially acquires a plurality of time-series frame images from a time T1 to before a time T2. It is assumed that time T2−time T1=time interval ΔT.

The image acquisition unit 111 thins out some of the plurality of frame images acquired in step S101, and acquires a query image (step S102).

Figure 10:
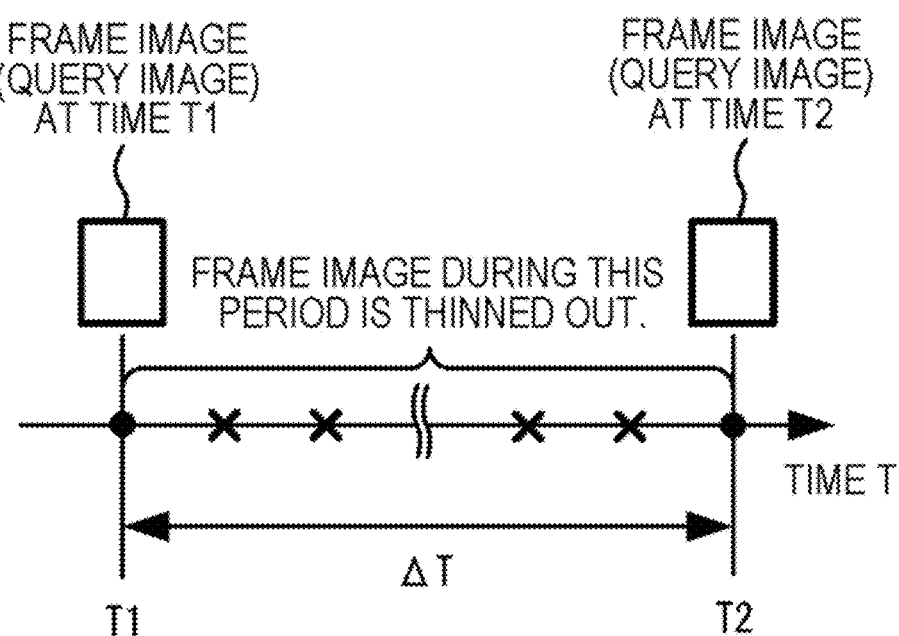
FIG. 10 is a diagram illustrating one example of a method of thinning out some of a plurality of frame images.

Specifically, for example, the image acquisition unit 111 thins out some of the plurality of frame images according to a previously determined rule. For example, FIG. 10 is a diagram illustrating one example of a method of thinning out some of a plurality of frame images. As illustrated in the figure, the image acquisition unit 111 thins out frame images acquired during a previously determined time interval ΔT (excluding times at both ends). Thereby, the image acquisition unit 111 acquires time-series query images at a previously determined constant time interval ΔT. Note that, a method of thinning out some of a plurality of frame images and acquiring a query image is not limited thereto, and, for example, the time interval ΔT may not be constant, and may be changed according to an operation mode (a mode of tracking a capture target person, and a mode of detecting a pose of a capture target person). Moreover, a query image may be a plurality of frame images that are not thinned out.

The pose acquisition unit 113 acquires first pose information based on a plurality of reference images associated with a predetermined pose, and second pose information based on the query image acquired in step S102 (step S103).

Specifically, for example, the pose acquisition unit 113 acquires a plurality of reference images associated with a predetermined pose from the storage unit 112. In a case where a predetermined pose is a talking pose and the reference information 112a illustrated in FIG. 5 is stored in the storage unit 112, the pose acquisition unit 113 acquires reference images 1 to 7. The pose acquisition unit 113 transmits the acquired reference images 1 to 7 to the analysis apparatus 102. In response thereto, the analysis apparatus 102 generates first pose information including the first model of a person shown in each of the reference images 1 to 7, and transmits the first pose information to the information processing apparatus 100. The pose acquisition unit 113 acquires first pose information from the analysis apparatus 102.

The pose acquisition unit 113 acquires, from the image acquisition unit 111, the query image acquired in step S102. The pose acquisition unit 113 transmits the acquired query image to the analysis apparatus 102. In response thereto, the analysis apparatus 102 generates second pose information including a second model of the capture target person indicated by the query image, and transmits the second pose information to the information processing apparatus 100. The pose acquisition unit 113 acquires the second pose information from the analysis apparatus 102.

The similarity degree acquisition unit 114 derives a similarity degree between each of the first models included in each of the first pose information and the second pose information acquired in step S102 and the second model (step S104).

Figure 11:
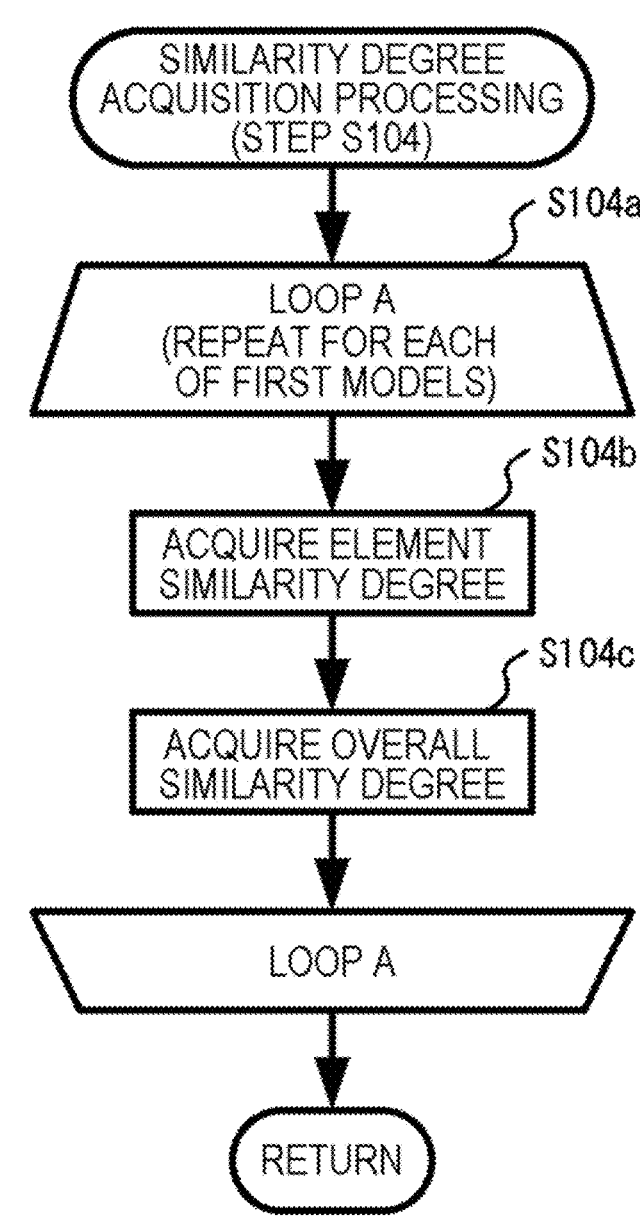
FIG. 11 is a flowchart illustrating a detailed example of similarity degree acquisition processing according to one example embodiment.

FIG. 11 is a flowchart illustrating a detailed example of similarity degree acquisition processing (step S104) according to the present example embodiment.

The element computation unit 114b repeats steps S104b to S104c for each of the first models included in the first pose information acquired in step S103 (step S104a).

The element computation unit 114b derives an element similarity degree being the similarity degree for each model element associated between the first model and the second model (step S104b).

The overall computation unit 114a acquires the weight information 112b stored in the storage unit 112, and derives an overall similarity degree between the first model and the second model, based on the element similarity degree for each model element derived in step S104b and a weight (step S104c).

For example, the overall computation unit 114a derives a sum of products of an element similarity degree of an associated model element and a weight, and determines the sum as an overall similarity degree.

The overall computation unit 114a derives an overall similarity degree between each of the first models and the second model as a result of repeating steps S104b to S104c for each of the first models included in the first pose information acquired in step S103. After executing steps S104b to S104c for each of the first models included in the first pose information acquired in step S103, the overall computation unit 114a ends a loop A (step S104a), and returns to the pose estimation processing.

FIG. 9 is referred to again.

The estimation unit 115 estimates a pose of the capture target person shown in the query image, based on the query image acquired in step S102 and a plurality of reference images (step S105).

For example, the estimation unit 115 estimates a pose of the capture target person shown in the query image, based on the overall similarity degree between the query image acquired in step S102 and each of reference images 1 to 7. Note that, in step S105, the estimating unit 115 may use any of the pose estimation methods 1 to 5 described above, or may use a method other than the pose estimation methods 1 to 5 described above, in order to estimate a pose of the capture target person.

The estimation unit 115 determines whether a predetermined pose has been detected (step S106).

Specifically, for example, in a case where it is estimated in step S105 that the capture target person shown in the query image is in a predetermined pose, the estimation unit 115 determines that the predetermined pose has been detected. In a case where it is estimated in step S105 that the capture target person shown in the query image is not in the predetermined pose, the estimation unit 115 determines that the predetermined pose has not been detected.

In a case where it is determined that the predetermined pose has not been detected (step S106; No), the image acquisition unit 111 executes step S101 again.

In a case where it is determined that the predetermined pose has been detected (step S106; No), the display control unit 119 causes the display unit 118 to display a fact that the predetermined pose has been detected (step S107). Thereafter, the image acquisition unit 111 executes step S101 again.

In step S107, the display control unit 119 causes the display unit 118 to display a query image showing the capture target person being in the predetermined pose. The query image displayed herein may be an image in which a mark is given to the capture target person, as described above.

A user can see the display unit 118 and know that the capture target person in the predetermined pose has been detected. For example, since there is a possibility of a victim of a bank transfer fraud or a suspicious person in a case of being in a talking pose during operation of an ATM, the user can take a measure such as notifying, for example, a security guard near the ATM to confirm.

By repeatedly performing such pose estimation processing, the pose of the capture target person can be estimated for each of the time-series query images.

Herein, in order to accurately estimate a pose of a capture target person, it is important that an appropriate reference image is set. However, a plurality of reference images are often set, and it is often not known which reference image is emphasized in order to estimate a pose. Thus, even in a case where the pose is estimated incorrectly, it is difficult to estimate a reference image being a cause of the incorrect estimation.

The estimation support processing is processing of retrieving a reference image showing a person whose pose or action is similar to that of a capture target person shown in a query image, in order to support estimation of a pose of the capture target person. In a case where incorrect estimation of a pose is performed, the estimation support processing is useful for estimating a reference image being a cause of the incorrect estimation. The estimation support processing is described below with reference to the drawings.

Figure 12:
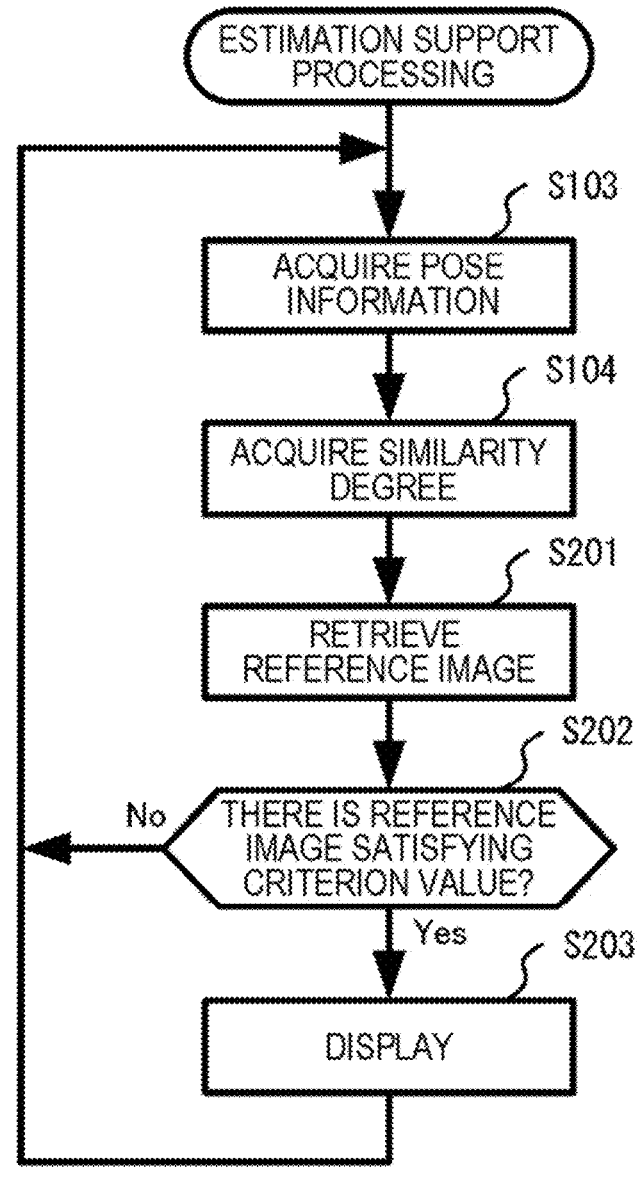
FIG. 12 is a flowchart illustrating one example of estimation support processing concerning one example embodiment.

FIG. 12 is a flowchart illustrating one example of estimation support processing according to the present example embodiment.

For example, a user specifies a query image, a pose, a maximum display number, a first criterion value indicating a lower limit value of an overall similarity degree, a second criterion value indicating a lower limit value of an element similarity degree, and the like, and gives a start instruction for retrieval, and then the estimation support processing starts in response to the start instruction.

A query image to be specified is, for example, a query image in which a pose is incorrectly estimated in the pose estimation processing. A pose to be specified is a pose targeted for retrieval. Description is given below by using an example targeted for a positive example of a talking pose (see FIG. 5). The first criterion value and the second criterion value are set in order to retrieve a reference image with a high possibility of affecting a result of estimation of a pose. The second criterion value indicates a lower limit value of a maximum element similarity degree among element similarity degrees relating to the second model associated with the reference image.

Note that, processing may be performed similarly for a negative example. Moreover, one or both of the maximum display number and the criterion value may not be set. In this case, in a case where the maximum display number is not set, a retrieval result may be displayed, for example, in descending order of similarity degrees of reference images.

FIG. 12 is referred to.

The pose acquisition unit 113, the similarity degree acquisition unit 114, and the estimation unit 115 execute processing similar to steps S103 to S105 of the pose estimation processing, for example, according to an instruction of the retrieval unit 117.

Specifically, for example, the pose acquisition unit 113 acquires first pose information based on a plurality of reference images associated with a talking pose being a specified pose, and second pose information based on a specified query image (step S103).

The similarity degree acquisition unit 114 derives a similarity degree between each of the first models included in each of the first pose information and the second pose information and the second model acquired in step S103 (step S104).

Based on the specified query image and a plurality of reference images, the estimation unit 115 estimates a pose of a capture target person shown in the query image (step S105).

The retrieval unit 117 retrieves, from among a plurality of reference images, a reference image showing a person whose pose or action is similar to that of the capture target person shown in the query image (step S201).

Specifically, for example, the retrieval unit 117 retrieves a reference image whose overall similarity degree is equal to or more than the first criterion value and whose maximum value of the element similarity degree is equal to or more than the second criterion value. The retrieval unit 117 outputs a retrieved result.

The display control unit 119 determines whether there is a reference image satisfying the criterion value, based on the retrieval result output from a retrieval unit 117 (step S202). In a case where there is no reference image satisfying the criterion value (step S202; No), the display control unit 119 ends the estimation support processing.

In a case where there is a reference image satisfying the criterion value (step S202; Yes), the display control unit 119 causes the display unit 118 to display a retrieval result and the like (step S203).

Specifically, for example, the display control unit 119 causes the display unit 119 to display at least one of the first pose information (e.g., the first model) and the second pose information (e.g., the second model) in a display mode according to an index used for retrieving the reference image. Moreover, in a case where a reference image satisfying a criterion value exceeds the display maximum number, the display control unit 119 chooses a reference image with the display maximum number in descending order of similarity degree (e.g., overall similarity degrees), and displays the reference image as a retrieval result.

Figure 13:
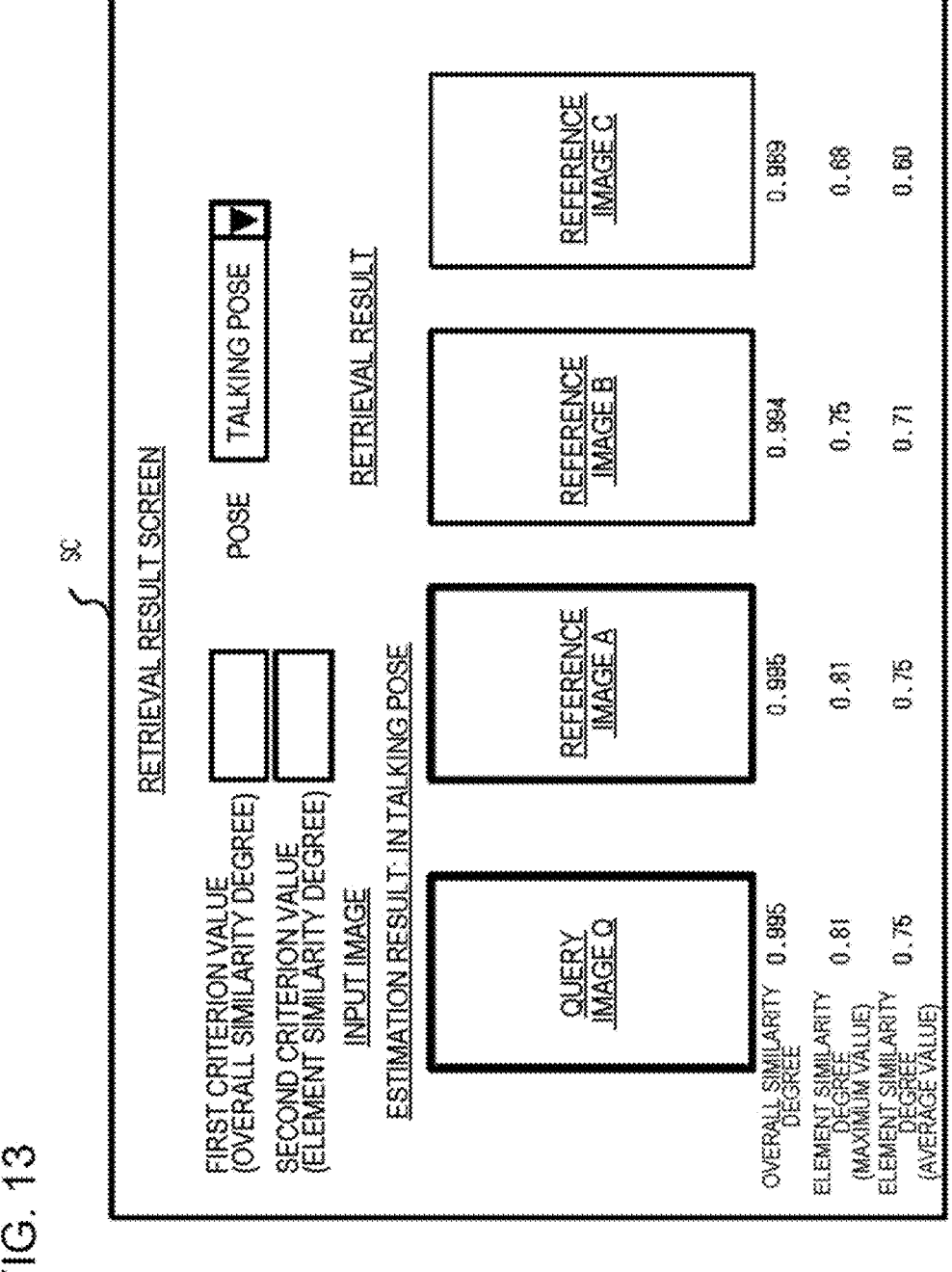
FIG. 13 is a diagram illustrating one example of a result display screen that displays a retrieval result.

FIG. 13 is a diagram illustrating one example of a result display screen SC that displays a retrieval result.

In the result display screen SC illustrated in FIG. 13, a set value of the first criterion value is 0.98, and a set value of the second criterion value is 0.5. Moreover, a "talking pose" is chosen as a pose. A result of estimation relating to a pose of a capture target person shown in a query image is a positive estimation ("being a talking pose").

FIG. 13 is an example of a case where the display maximum number is "3". The result display screen SC includes a query image Q being an input image, and reference images A to C being retrieval results. The reference images A to C are one of the positive examples (reference images 1 to M) illustrated in FIG. 5.

Below each of the query image Q and the reference images A to C, an overall similarity degree, an element similarity degree (maximum value), and an element similarity degree (average value) are displayed.

Specifically, the overall similarity degree, the element similarity degree (maximum value), and the element similarity degree (average value) with respect to the related reference image are displayed below the query image Q. In the example illustrated in FIG. 13, the query image Q is related to the reference image A with the maximum overall similarity degree among reference images A to C. In other words, the reference image A is equivalent to the "specific reference image". Since the query image Q is related to reference image A, each similarity degree associated with the query image Q has the same value as each similarity degree associated with the reference image A.

Moreover, FIG. 13 illustrates an example in which an overall similarity degree between the query image Q and each of the reference images A to C is represented by a thickness of a rectangular frame line surrounding an image. In the example illustrated in FIG. 13, the query image Q and each of the reference images A to C are surrounded by three types of rectangular frame lines of different thicknesses according to the overall similarity degree. In this way, by changing a display mode of the first pose information (e.g., the first model) and the second pose information (e.g., the second model) according to a magnitude of the overall similarity degree, it becomes easy to intuitively recognize a magnitude of the overall similarity degree.

Figure 14:
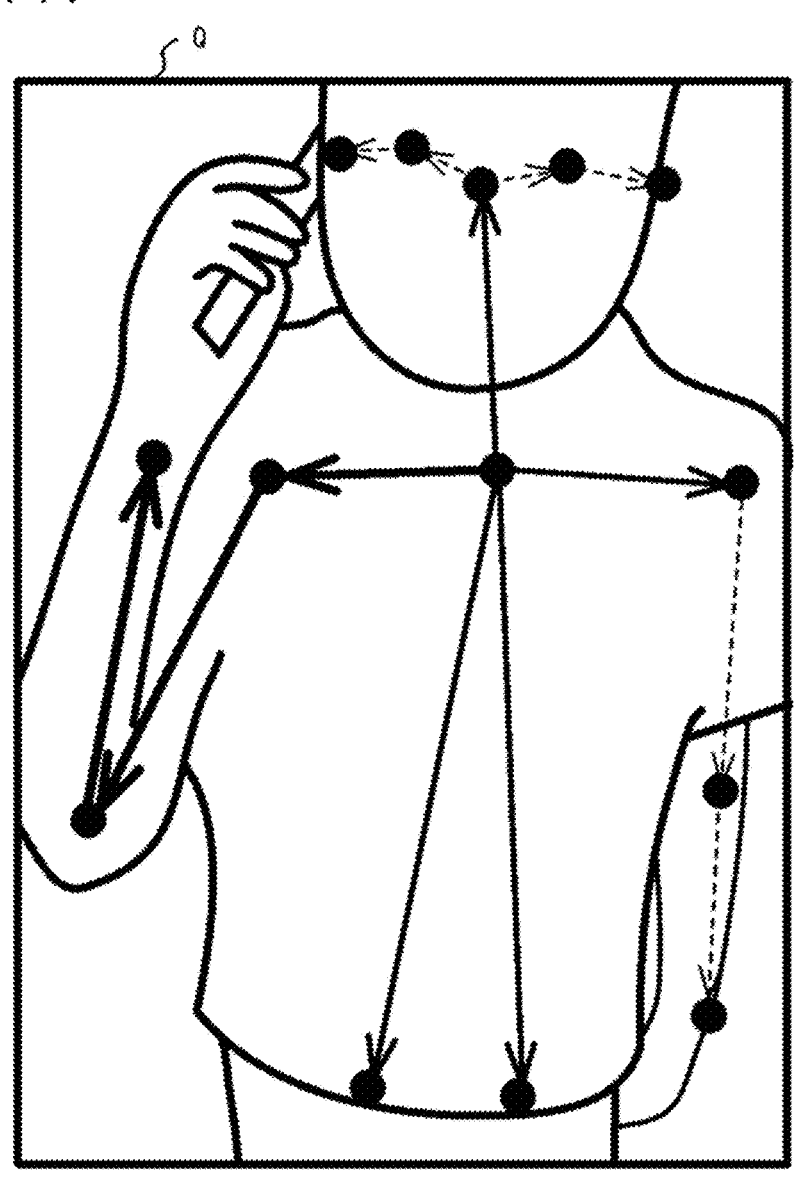
FIG. 14 is a diagram illustrating a display example of a query image on a result display screen.

FIG. 14 is a diagram illustrating a display example of the query image Q. FIG. 14 illustrates an example in which the second model is superimposed and displayed on the query image Q.

In the second model illustrated in FIG. 14, a circle represents a joint element. A line with an arrow connecting joint elements represents a trunk element and a bone element. The arrow originates at an upper center of a chest (near a base of a neck), and indicates a direction away from the origin. Two lines extending downward from the origin represent trunk elements, and another line represents a bone element. Note that, an origin may be set as appropriate.

In the second model illustrated in FIG. 14, the trunk elements and bone elements are represented by lines of three types of different thicknesses and two types of different line types (solid lines and dotted lines). A thickness is associated with a weight. The line type is associated with an element similarity degree. Specifically, the second model illustrated in FIG. 14 represents weights in three levels, and a model element with a larger associated weight has a thicker line. Moreover, the second model illustrated in FIG. 14 represents, at two levels, an element similarity degree between each of model elements making up the first model associated with the related reference image A, and the second model associated with each of the model elements. A large element similarity degree is a solid line, and a small element similarity degree is a dotted line.

For each of the reference images A to C, although not illustrated, it is preferable that the first model is superimposed and displayed, similarly to the query image Q. Moreover, it is preferable that a model element of the first model is displayed in a different display mode according to a weight and an element similarity degree, similarly to the second model.

In this way, by changing a display mode of a model element according to a weight and an element similarity degree, it becomes easy to intuitively recognize a magnitude of a weight and an element similarity degree.

Figure 15:
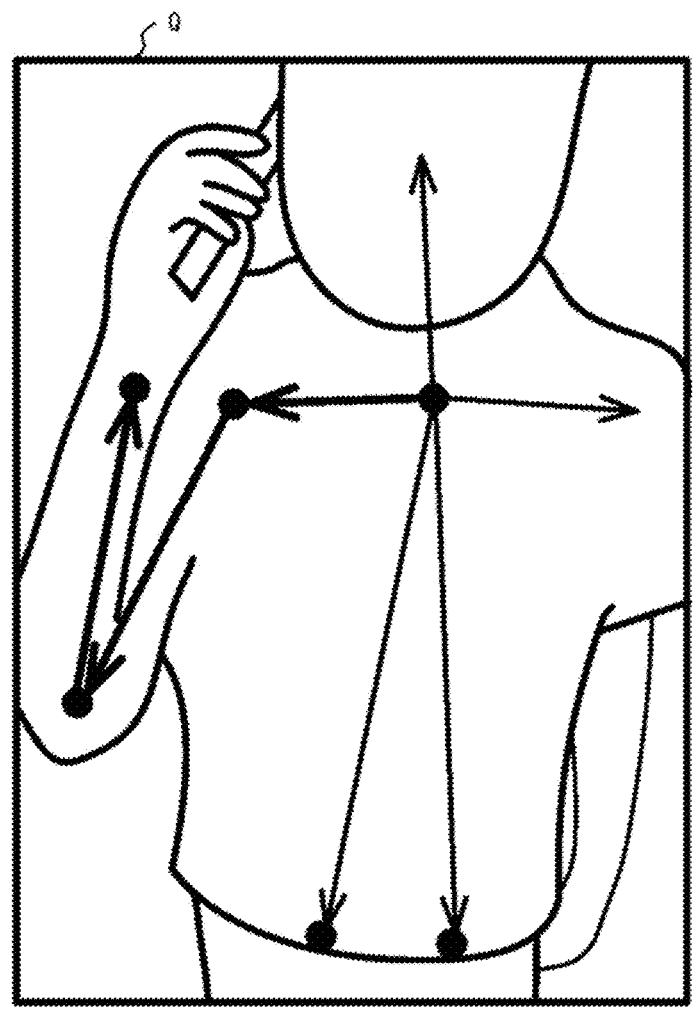
FIG. 15 is a diagram illustrating another display example of a query image on the result display screen.

FIG. 15 is a diagram illustrating another display example of the query image Q. FIG. 15 is an example in which the display unit 118 is caused to display only model elements (a bone element and a trunk element) represented by a solid line in FIG. 14 and a joint element related thereto, this is, a model element whose element similarity degree is large and a joint element related thereto. The query images Q illustrated in FIGS. 14 and 15 are the same, except that model elements with a small element similarity degree and a joint element related thereto not displayed.

Note that, in FIG. 15, an example in which the display unit 118 is caused to display the query image Q that includes only model elements with a large element similarity degree and a joint element related to these has been described. In other words, an example in which model elements with a small element similarity degree and a joint element related thereto are not included in display of the query image Q has been described. However, in display of the query image Q, a display method of model elements with a small element similarity degree and a joint element related thereto is not limited to thereto. For example, model elements with a small element similarity degree and a joint element related thereto may be displayed thin or small, or may be displayed in a semitransparent manner, and may be displayed by a figure (e.g., an x) different from other model elements and a joint element related thereto.

Advantage and Effect

As described above, according to the present example embodiment, the information processing apparatus 100 includes the pose acquisition unit 113, the retrieval unit 117, and the display control unit 119.

The pose acquisition unit 113 acquires first pose information indicating a pose of a person shown in each of a plurality of reference images associated with a predetermined pose, and second pose information indicating a pose of a capture target person shown in a query image. The retrieval unit 117 retrieves a reference image showing a person whose pose or action is similar to that of the capture target person shown in the query image, from among the plurality of reference images, based on a similarity degree between the first pose information and the second pose information. The display control unit 119 causes the display unit 118 to display at least one of the first pose information and the second pose information in a display mode according to an index used for retrieving the reference image.

Thereby, since at least one of the first pose information and the second pose information is displayed in a display mode according to the index described above, a user can intuitively recognize the index used for retrieving the reference image, and estimate an inappropriate reference image in order to estimate a pose of a capture target person. Thus, the user can take such a measure as deleting an inappropriate reference image. Therefore, it becomes possible to improve accuracy of estimating a pose of a capture target person shown in an image.

According to the present example embodiment, an index includes a similarity degree. The display control unit 119 causes the display unit 118 to display at least one of first pose information and second pose information in a display mode according to the similarity degree.

Thereby, since at least one of the first pose information and the second pose information is displayed in a display mode according to the similarity degree, a user can intuitively recognize the similarity degree, and estimate an inappropriate reference image in order to estimate a pose of a capture target person. Thus, the user can take such a measure as deleting an inappropriate reference image. Therefore, it becomes possible to improve accuracy of estimating a pose of a capture target person shown in an image.

According to the present example embodiment, in a case where the second pose information is displayed, the display control unit 119 relates the second pose information to a specific reference image among a plurality of reference images, and causes the display unit 118 to display the second pose information in a display mode according to a similarity degree between the second pose information and the first pose information associated with the specific reference image.

Thereby, since the second pose information is displayed in a display mode according to the similarity degree, a user can intuitively recognize the similarity degree relating to the second pose information, and estimate an inappropriate reference image in order to estimate a pose of a capture target person. Thus, the user can take such a measure as deleting an inappropriate reference image. Therefore, it becomes possible to improve accuracy of estimating a pose of a capture target person shown in an image.

According to the present example embodiment, the first pose information includes a first model being a pose estimation model relating to the person shown in a reference image. The second pose information includes a second model being a pose estimation model shown to a capture target person included in a query image. The pose estimation model is made up of a plurality of model elements.

Thereby, since at least one of the first model and the second model is displayed in a display mode according to an index, a user can intuitively recognize a pose estimation model and an index used for retrieving the reference image, and estimate an inappropriate reference image in order to estimate a pose of a capture target person. Thus, the user can take such a measure as deleting an inappropriate reference image. Therefore, it becomes possible to improve accuracy of estimating a pose of a capture target person shown in an image.

According to the present example embodiment, an index includes a weight indicating a degree to which each model element is emphasized in order to derive a similarity degree between pose estimation models in a predetermined pose. The display control unit 119 causes the display unit 118 to display a plurality of model elements making up at least one of the first model and the second model in a display mode according to the weight.

Thereby, since at least one of the first model and the second model is displayed in a display mode according to the weight, a user can intuitively recognize a pose estimation model and a weight used for retrieving the reference image, and estimate an inappropriate reference image in order to estimate a pose of a capture target person. Thus, the user can take such a measure as deleting an inappropriate reference image. Therefore, it becomes possible to improve accuracy of estimating a pose of a capture target person shown in an image.

According to the present example embodiment, a similarity degree includes at least one of an overall similarity degree being an overall similarity degree between the first model and the second model, and an element similarity degree being a similarity degree for each model element associated between the first model and the second model.

Thereby, at least one of the first model and the second model is displayed in a display mode according to at least one of the overall similarity degree and the element similarity degree. Thus, a user can intuitively recognize at least one of the first model and the second model used for retrieving the reference image, and at least one of an overall similarity degree and the element similarity degree, and estimate an inappropriate reference image in order to estimate a pose of a capture target person. Thus, the user can take such a measure as deleting an inappropriate reference image. Therefore, it becomes possible to improve accuracy of estimating a pose of a capture target person shown in an image.

According to the present example embodiment, an index includes a similarity degree. In a case where the second model is displayed, the display control unit 119 relates the second model to a specific reference image among a plurality of reference images, and causes the display unit 118 to display the second model in a display mode according to a similarity degree between the second model and the first model associated with the specific reference image. The first model associated with the specific reference image is a first model with the largest overall similarity degree, a first model including the largest element similarity degree, or a first model specified by a user.

Thereby, since the second model is displayed in a display mode according to the similarity degree, a user can intuitively recognize the similarity degree between the first model and the second model associated with a specific reference image, and estimate an inappropriate reference image in order to estimate a pose of a capture target person. Thus, the user can take such a measure as deleting an inappropriate reference image. Therefore, it becomes possible to improve accuracy of estimating a pose of a capture target person shown in an image.

According to the present example embodiment, in a case where the second model is displayed, the display control unit 119 derives an average value of an element similarity degree for each model element, and causes the display unit 118 to display the second model in a display mode according to the average value.

Thereby, since the second model is displayed in a display mode according to the similarity degree, a user can intuitively recognize the similarity degree between the first model and the second model associated with a specific reference image, and estimate an inappropriate reference image in order to estimate a pose of a capture target person. Thus, the user can take such a measure as deleting an inappropriate reference image. Therefore, it becomes possible to improve accuracy of estimating a pose of a capture target person shown in an image.

According to the present example embodiment, in a case where the similarity degree includes an element similarity degree, the display control unit 119 causes the display unit 118 to display only a model element with the element similarity degree equal to or more than a first criterion value and equal to or less than a second criterion value or with a weight equal to or more than a predetermined threshold value, among model elements making up at least one of the first model and the second model.

Thereby, the display unit 118 can be caused to display only a model element with the element similarity degree equal to or more than the first criterion value or equal to or less than the second criterion value. Thus, a user can intuitively recognize a part that is estimated to be similar overall but is not similar, or a part that is estimated to be dissimilar overall but is similar.

Moreover, the display unit 118 can be caused to display only a model element with a weight equal to or more than a predetermined threshold value. Thus, the user can intuitively recognize a part to which a large weight is set.

Thus, the user can take such a measure as deleting an inappropriate reference image. Therefore, it becomes possible to improve accuracy of estimating a pose of a capture target person shown in an image.

According to the present example embodiment, the information processing apparatus 100 further includes the similarity degree acquisition unit 114 that acquires a similarity degree by using the first model and the second model.

Thereby, a user can intuitively recognize an index relating to at least one of a first model and a second model used for deriving a similarity degree in relation to at least one of the first model and the second model. Thus, the user can take such a measure as deleting an inappropriate reference image. Therefore, it becomes possible to improve accuracy of estimating a pose of a capture target person shown in an image.

According to the present example embodiment, the similarity degree acquisition unit 114 includes the overall computation unit 114$a$ that derives an overall similarity degree between the first model and the second model.

Thereby, a user can intuitively recognize an overall similarity degree relating to at least one of the first model and the second model used for deriving the overall similarity degree in relation to at least one of the first model and the second model. Thus, the user can take such a measure as deleting an inappropriate reference image. Therefore, it becomes possible to improve accuracy of estimating a pose of a capture target person shown in an image.

According to the present example embodiment, the similarity degree acquisition unit 114 further includes an element computation unit that derives an element similarity degree being a similarity degree for each model element associated between the first model and the second model. The overall computation unit 114$a$ derives an overall similarity degree by using a weight indicating a degree to which each model element is emphasized in order to derive a similarity degree between pose estimation models in a predetermined pose, and the element similarity degree.

Thereby, a user can intuitively recognize an overall similarity degree and an element similarity degree relating to at least one of the first model and the second model used for deriving the overall similarity degree and the element similarity degree, in relation to at least one of the first model and the second model. Thus, the user can take such a measure as deleting an inappropriate reference image. Therefore, it becomes possible to improve accuracy of estimating a pose of a capture target person shown in an image.

According to the present example embodiment, a model element includes joint elements associated with a plurality of joints, and a trunk element and a bone element associated with a trunk and a skeleton connecting the plurality of joints. The display control unit 119 causes the display unit 118 to display at least one of the trunk element and the bone element as a line with an arrow.

Generally, in a case where a line representing a bone element is close on an image on a display of the display unit 118, it may be difficult to understand, with a line with no arrow, an association between the line representing the bone element and a skeleton of a capture target person. By attaching an arrow to the line, association between the line representing the bone element and the skeleton of the capture target person can be facilitated. Thus, intuitive recognition can be facilitated. Therefore, it becomes possible to improve accuracy of estimating a pose of a capture target person shown in an image.

The example embodiments and the modified examples of the present invention have been described above with reference to the drawings, but are exemplifications of the present invention, and various configurations other than those described above can also be adopted.

Moreover, although a plurality of processes (pieces of processing) are described in order in a plurality of flowcharts used in the above description, an execution order of processes executed in each example embodiment is not limited to the described order. In each example embodiment, an order of illustrated processes can be changed to an extent that causes no problem in terms of content. Moreover, each of the example embodiments and the modified examples described above can be combined to an extent that content does not contradict.

Some or all of the above-described example embodiments can also be described as, but are not limited to, the following supplementary notes.

1. An information processing apparatus including:

a pose acquisition unit that acquires first pose information indicating a pose of a person shown in each of a plurality of reference images associated with a predetermined pose, and second pose information indicating a pose of a capture target person shown in a query image;

a retrieval unit that retrieves a reference image showing a person whose pose or action is similar to that of the capture target person shown in the query image, from among the plurality of reference images, based on a similarity degree between the first pose information and the second pose information; and a display control unit that causes a display unit to display at least one of the first pose information and the second pose information in a display mode according to an index used for retrieving the reference image.

2. The information processing apparatus according to supplementary note 1, wherein the index includes the similarity degree, and the display control unit causes the display unit to display at least one of the first pose information and the second pose information in a display mode according to the similarity degree.

3. The information processing apparatus according to supplementary note 2, wherein, in a case where the second pose information is displayed, the display control unit relates the second pose information to a specific reference image among the plurality of reference images, and causes the display unit to display the second pose information in a display mode according to the similarity degree between the second pose information and first pose information associated with the specific reference image.

4. The information processing apparatus according to any one of supplementary notes 1 to 3, wherein the first pose information includes a first model being a pose estimation model relating to a person shown in the reference image, the second pose information includes a second model being a pose estimation model shown to a capture target person included in the query image, and the pose estimation model is made up of a plurality of model elements.

5. The information processing apparatus according to supplementary note 4, wherein the index includes a weight indicating a degree to which each of the model elements is emphasized in order to derive a similarity degree between the pose estimation models in the predetermined pose, and the display control unit causes the display unit to display a plurality of model elements making up at least one of the first model and the second model in a display mode according to the weight.

6. The information processing apparatus according to supplementary note 4 or 5, wherein the similarity degree includes at least one of an overall similarity degree being an overall similarity degree between the first model and the second model, and an element similarity degree being a similarity degree for each associated model element between the first model and the second model.

7. The information processing apparatus according to supplementary note 6, wherein the index includes the similarity degree, in a case where the second model is displayed, the display control unit relates the second model to a specific reference image among the plurality of reference images, and causes the display unit to display the second model in a display mode according to the similarity degree between the second model and the first model associated with the specific reference image, and the first model associated with the specific reference image is a first model with the largest maximum overall similarity degree, a first model including the largest element similarity degree, or a first model specified by a user.

8. The information processing apparatus according to supplementary note 6, wherein, in a case where the second model is displayed, the display control unit derives an average value of the element similarity degree for each of the model elements, and causes the display unit to display the second model in a display mode according to the average value.

9. The information processing apparatus according to any one of supplementary notes 4 to 8, wherein, in a case where the similarity degree includes the element similarity degree, the display control unit causes the display unit to display only a model element with the element similarity degree equal to or more than a first criterion value and equal to or less than a second criterion value or with a weight equal to or more than a predetermined threshold value, among model elements making up at least one of the first model and the second model.

10. The information processing apparatus according to any one of supplementary notes 4 to 9, further including a similarity degree acquisition unit that derives the similarity degree by using the first model and the second model.

11. The information processing apparatus according to supplementary note 10, wherein the similarity degree acquisition unit includes an overall computation unit that derives the overall similarity degree between the first model and the second model.

12. The information processing apparatus according to supplementary note 11, wherein the similarity degree acquisition unit further includes an element computation unit that derives the element similarity degree being a similarity degree for each model element associated between the first model and the second model, and the overall computation unit derives the overall similarity degree by using a weight indicating a degree to which each of the model elements is emphasized in order to derive a similarity degree between the pose estimation models in the predetermined pose, and the element similarity degree.

13. The information processing apparatus according to any one of supplementary notes 4 to 12, wherein the model element includes a joint element associated with a plurality of joints, and a trunk element and a bone element associated with each of a trunk and a skeleton connecting between the plurality of joints, and the display control unit causes a display unit to display at least one of the trunk element and the bone element as a line with an arrow.

14. An information processing method including, by a computer:

acquiring first pose information indicating a pose of a person shown in each of a plurality of reference images associated with a predetermined pose, and second pose information indicating a pose of a capture target person shown in a query image;

retrieving a reference image showing a person whose pose or action is similar to that of the capture target person shown in the query image, from among the plurality of reference images, based on a similarity degree between the first pose information and the second pose information; and causing a display unit to display at least one of the first pose information and the second pose information in a display mode according to an index used for retrieving the reference image.

15. A storage medium storing a program for causing a computer to execute:

acquiring first pose information indicating a pose of a person shown in each of a plurality of reference images associated with a predetermined pose, and second pose information indicating a pose of a capture target person shown in a query image;

retrieving a reference image showing a person whose pose or action is similar to that of the capture target person shown in the query image, from among the plurality of reference images, based on a similarity degree between the first pose information and the second pose information; and causing a display unit to display at least one of the first pose information and the second pose information in a display mode according to an index used for retrieving the reference image.

16. A program for causing a computer to execute:

acquiring first pose information indicating a pose of a person shown in each of a plurality of reference images associated with a predetermined pose, and second pose information indicating a pose of a capture target person shown in a query image;

retrieving a reference image showing a person whose pose or action is similar to that of the capture target person shown in the query image, from among the plurality of reference images, based on a similarity degree between the first pose information and the second pose information; and causing a display unit to display at least one of the first pose information and the second pose information in a display mode according to an index used for retrieving the reference image.

REFERENCE SIGNS LIST

100 Information processing apparatus
101 Capture unit
102 Analysis apparatus
111 Image acquisition unit
112 Storage unit
112a Reference information
112b Weight information
113 Pose acquisition unit
114 Similarity degree acquisition unit
114a Overall computation unit
114b Element computation unit
115 Estimation unit
116 Input unit
117 Retrieval unit
118 Display unit
119 Display control unit

What is claimed is:

1. An information processing apparatus comprising:

at least one memory storing instructions; and at least one processor configured to execute the instructions to:

acquire first pose information regarding a first model configured with a plurality of model elements, the first pose information indicating a pose of a person shown in each of a plurality of reference images associated with a predetermined pose, and second pose information regarding a second model configured with the plurality of model elements, the second pose information indicating a pose of a capture target person shown in a query image;

retrieve a reference image showing a person whose pose or action is similar to that of the capture target person shown in the query image, from among the plurality of reference images, based on a similarity degree between the first pose information and the second pose information; and cause a display to display at least one of the first pose information and the second pose information in a display mode according to an index used for retrieving the reference image, the index includes a weight indicating a degree to which each of model elements is emphasized in order to derive the similarity degree between pose estimation models in the predetermined pose.

2. The information processing apparatus according to claim 1, wherein the index includes the similarity degree, and the at least one processor is further configured to execute the instructions to cause the display to display at least one of the first pose information and the second pose information in the display mode according to the similarity degree.

3. The information processing apparatus according to claim 2, wherein the at least one processor is further configured to execute the instructions to, in a case where the second pose information is displayed, relate the second pose information to a specific reference image among the plurality of reference images; and cause the display to display the second pose information in the display mode according to the similarity degree between the second pose information and the first pose information associated with the specific reference image.

4. The information processing apparatus according to claim 1, wherein the at least one processor is further configured to execute the instructions to cause the display to display a plurality of model elements making up at least one of the first model and the second model in the display mode according to the weight.

5. The information processing apparatus according to claim 1, wherein the similarity degree includes at least one of an overall similarity degree being an overall similarity degree between the first model and the second model, and an element similarity degree being a similarity degree for each associated model element between the first model and the second model.

6. The information processing apparatus according to claim 1, wherein the index includes the similarity degree, the at least one processor is further configured to execute the instructions to, in a case where the second model is displayed, relate the second model to a specific reference image among the plurality of reference images; and cause the display to display the second model in the display mode according to the similarity degree between the second model and the first model associated with the specific reference image, and the first model associated with the specific reference image is any of a model with a largest maximum overall similarity degree, a model including a largest element similarity degree, and a model specified by a user.

7. The information processing apparatus according to claim 5, wherein, the at least one processor is further configured to execute the instructions to, in a case where the second model is displayed, derive an average value from the element similarity degrees for each of model elements; and cause the display to display the second model in the display mode according to the average value.

8. The information processing apparatus according to claim 5, wherein, the at least one processor is further configured to execute the instructions to, in a case where the similarity degree includes the element similarity degrees, cause the display to display only a model element with an element similarity degree of the element similarity degrees equal to or more than a first criterion value and equal to or less than a second criterion value or with a weight equal to or more than a predetermined threshold value, among model elements making up at least one of the first model and the second model.

9. The information processing apparatus according to claim 5, wherein the at least one processor is further configured to execute the instructions to derive the similarity degree by using the first model and the second model.

10. The information processing apparatus according to claim 9, wherein the similarity degree derived by using the first model and the second model includes the overall similarity degree between the first model and the second model.

11. The information processing apparatus according to claim 10, wherein the at least one processor is further configured to execute the instructions to derive the overall similarity degree by using a weight indicating a degree to which each of model elements is emphasized in order to derive a similarity degree between pose estimation models in the predetermined pose, and the element similarity degrees.

12. The information processing apparatus according to claim 1, wherein a model element includes a joint element associated with a plurality of joints, and a trunk element and a bone element associated with each of a trunk and a skeleton connecting between the plurality of joints, and the at least one processor is further configured to execute the instructions to cause the display to display at least one of the trunk element and the bone element as a line with an arrow.

13. The information processing apparatus according to claim 1, wherein the similarity degree includes a plurality of element similarity degrees, regarding each of the plurality of corresponding model elements between the first model and the second model, and an overall similarity degree between the first model and the second model, the overall similarity degree being calculated based on the plurality of element similarity degrees.

14. An information processing method comprising, acquiring first pose information regarding a first model configured with a plurality of model elements, the first pose information indicating a pose of a person shown in each of a plurality of reference images associated with a predetermined pose, and second pose information regarding a second model configured with the plurality of model elements, the second pose information indicating a pose of a capture target person shown in a query image;

retrieving a reference image showing a person whose pose or action is similar to that of the capture target person shown in the query image, from among the plurality of reference images, based on a similarity degree between the first pose information and the second pose information; and causing a display to display at least one of the first pose information and the second pose information in a display mode according to an index used for retrieving the reference image, the index includes a weight indicating a degree to which each of model elements is emphasized in order to derive the similarity degree between pose estimation models in the predetermined pose.

15. A non-transitory computer readable medium storing a program for causing a computer to execute:

acquiring first pose information regarding a first model configured with a plurality of model elements, the first pose information indicating a pose of a person shown in each of a plurality of reference images associated with a predetermined pose, and second pose information regarding a second model configured with the plurality of model elements, the second pose information indicating a pose of a capture target person shown in a query image;

retrieving a reference image showing a person whose pose or action is similar to that of the capture target person shown in the query image, from among the plurality of reference images, based on a similarity degree between the first pose information and the second pose information; and causing a display to display at least one of the first pose information and the second pose information in a display mode according to an index used for retrieving the reference image, the index includes a weight indicating a degree to which each of model elements is emphasized in order to derive the similarity degree between pose estimation models in the predetermined pose.

* * * * *